(12) United States Patent
Chosokabe

(10) Patent No.: US 8,200,350 B2
(45) Date of Patent: Jun. 12, 2012

(54) CONTENT REPRODUCING APPARATUS, LIST CORRECTING APPARATUS, CONTENT REPRODUCING METHOD, AND LIST CORRECTING METHOD

(75) Inventor: Yoshihiro Chosokabe, Nagano (JP)

(73) Assignee: Sony Corporation, Tokyo (JP)

( * ) Notice: Subject to any disclaimer, the term of this patent is extended or adjusted under 35 U.S.C. 154(b) by 1127 days.

(21) Appl. No.: 11/563,899

(22) Filed: Nov. 28, 2006

(65) Prior Publication Data

US 2007/0143268 A1 Jun. 21, 2007

(30) Foreign Application Priority Data

Dec. 20, 2005 (JP) ................................. 2005-366511

(51) Int. Cl.
*G06F 17/00* (2006.01)
(52) U.S. Cl. .................... 700/94; 715/716; 715/727
(58) Field of Classification Search ............ 700/94
See application file for complete search history.

(56) References Cited

U.S. PATENT DOCUMENTS

| | | | |
|---|---|---|---|
| 6,657,116 B1* | 12/2003 | Gunnerson | 84/615 |
| 6,819,344 B2* | 11/2004 | Robbins | 715/848 |
| 7,013,301 B2* | 3/2006 | Holm et al. | 707/741 |
| 7,013,435 B2* | 3/2006 | Gallo et al. | 715/850 |
| 7,043,477 B2* | 5/2006 | Mercer et al. | 1/1 |
| 7,081,579 B2* | 7/2006 | Alcalde et al. | 84/608 |
| 7,231,389 B2* | 6/2007 | Yamane et al. | 1/1 |
| 7,243,104 B2* | 7/2007 | Bill | 1/1 |
| 7,328,153 B2* | 2/2008 | Wells et al. | 704/231 |
| 7,532,943 B2* | 5/2009 | Weare | 700/94 |
| 7,678,984 B1* | 3/2010 | Lamere | 84/615 |
| 7,756,281 B2* | 7/2010 | Goldstein et al. | 381/309 |
| 7,772,479 B2* | 8/2010 | Kobayashi | 84/612 |
| 2002/0138630 A1* | 9/2002 | Solomon et al. | 709/228 |
| 2003/0221541 A1* | 12/2003 | Platt | 84/609 |
| 2003/0236582 A1* | 12/2003 | Zamir et al. | 700/94 |

(Continued)

FOREIGN PATENT DOCUMENTS

JP 2000-207415 7/2000

(Continued)

OTHER PUBLICATIONS

Office Action issued Feb. 3, 2011 in Japan Application No. 2005-366511.

*Primary Examiner* — Curtis Kuntz
*Assistant Examiner* — Paul McCord
(74) *Attorney, Agent, or Firm* — Oblon, Spivak, McClelland, Maier & Neustadt, L.L.P.

(57) ABSTRACT

A content reproducing apparatus includes: a recording unit that records content impression values obtained by digitizing impressions of plural contents, respectively, and a list for registering the plural contents corresponding to the plural content impression values in a selection area with a reference impression value set as a reference and causing a user to use the contents; a reproducing unit that reproduces the contents; an evaluation-value detecting unit that detects evaluation values of the plural contents registered in the list according to reproduction of the contents by the reproducing unit; a selection-area changing unit that changes the selection area on the basis of the evaluation values detected by the evaluation-value detecting unit; and a list correcting unit that corrects the list according to the selection area changed by the selection-area changing unit and the plural content impression values.

21 Claims, 18 Drawing Sheets

U.S. PATENT DOCUMENTS

| | | | |
|---|---|---|---|
| 2004/0267693 A1* | 12/2004 | Lowe et al. | 707/1 |
| 2005/0038819 A1* | 2/2005 | Hicken et al. | 707/104.1 |
| 2006/0195403 A1* | 8/2006 | New et al. | 705/59 |
| 2006/0206478 A1* | 9/2006 | Glaser et al. | 707/5 |
| 2007/0016599 A1* | 1/2007 | Plastina et al. | 707/101 |
| 2007/0233726 A1* | 10/2007 | Torrens et al. | 707/102 |

FOREIGN PATENT DOCUMENTS

| | | |
|---|---|---|
| JP | 2002-183152 | 6/2002 |
| JP | 2003-15666 | 1/2003 |
| JP | 2004-86189 | 3/2004 |
| JP | 2004-117632 | 4/2004 |
| JP | 2004-171096 | 6/2004 |
| JP | 2005-010771 | 1/2005 |
| JP | 2005-18205 | 1/2005 |
| JP | 2005-32409 | 2/2005 |
| JP | 2005-309712 | 11/2005 |

* cited by examiner

| SPEED | SLOW FEELING ←→ FAST FEELING |
| TONE | ANALOG FEELING ←→ DIGITAL FEELING |
| AGE | OLD FEELING ←→ NEW FEELING |

FIG. 10

| | PLAY LIST A | — PLI |
|---|---|---|
| | SELECTION REFERENCE IMPRESSION VALUE | — SSI |
| 1 | C:¥MP3¥AAA¥ABC.mp3 | — SS |
| 2 | Y:¥MP3¥RCP¥BTW.mp3 | |
| 3 | C:¥MP3¥ABZ¥YHA.mp3 | |
| ⋮ | ⋮ | |
| N | Y:¥MP3¥EHE¥NER.mp3 | |

50

CONTENT REPRODUCING APPARATUS, LIST CORRECTING APPARATUS, CONTENT REPRODUCING METHOD, AND LIST CORRECTING METHOD

CROSS-REFERENCES TO RELATED APPLICATIONS

The present invention contains subject matter related to Japanese Patent Application JP 2005-366511 filed in the Japanese Patent Office on Dec. 20, 2005, the entire contents of which being incorporated herein by reference.

BACKGROUND OF THE INVENTION

1. Field of the Invention

The present invention relates to a content reproducing apparatus, a list correcting apparatus, a content reproducing method, and a list correcting method and is suitably applied to, for example, a data recording and reproducing apparatus that records and reproduces music data.

2. Description of the Related Art

A music searching apparatus in the past generates impression values formed by two-dimensional data representing impressions of plural pieces of music by digitizing the impressions, respectively, and displays these plural impression values on a two-dimensional plane image as dots, respectively. The music searching apparatus causes a user to select the respective dots on such two-dimensional plane image as pieces of music (see, for example, JP-A-2005-10771 (pages 14 and 15 and FIG. 7).

SUMMARY OF THE INVENTION

If the music searching apparatus having such a constitution causes the user to select the plural dots on the two-dimensional plane image as pieces of music, respectively, and registers the plural pieces of music selected in a list, it is possible to cause the user to easily use the plural pieces of music collectively in accordance with such a list. However, since such a music searching apparatus represents the impressions of the plural pieces of music as the impression values formed by two-dimensional data, it is difficult to cause the user to accurately recognize the impressions of the music from the respective dots on the two-dimensional plane image. Therefore, in such a music searching apparatus, it is difficult to cause the user to accurately select contents having impressions of the user's preferences. Therefore, even if the music searching apparatus causes the user to select plural pieces of music and registers the music in the list, it is not always possible to cause the user to use contents having impressions of the user's preferences in accordance with such a list.

Therefore, it is desirable to provide a content reproducing apparatus, a list correcting apparatus, a content reproducing method, a list correcting method that can cause a user to use contents having impressions of the user's preferences in accordance with the list.

According to an embodiment of the invention, content impression values obtained by digitizing impressions of plural contents, respectively, and a list for registering plural contents corresponding to plural content impression values in a selection area with a reference impression value set as a reference and causing a user to use the plural contents are recorded in advance. Evaluation values of the plural contents registered in the list are detected according to reproduction of the contents. The selection area is changed on the basis of the evaluation values detected. The list is corrected according to the selection area changed and the plural content impression values.

Therefore, according to the embodiment of the invention, it is possible to correct a list created by using content impression values to register contents having impression of a user's preferences.

According to an embodiment of the invention, content impression values obtained by digitizing impressions of plural contents, respectively, and a list for registering plural contents corresponding to plural content impression values in a selection area with a reference impression value set as a reference and causing a user to use the plural contents are recorded in advance. Evaluation values of the plural contents registered in the list are detected according to reproduction of the contents. The selection area is changed on the basis of the evaluation values detected. The list is corrected according to the selection area changed and the plural content impression values. Thus, it is possible to correct a list created by using content impression values to register contents having impression of a user's preferences. Consequently, it is possible to realize a content reproducing apparatus, a list correcting apparatus, a content reproducing method, and a list correcting method can cause the user to use contents having impressions of the user's preferences in accordance with the list.

BRIEF DESCRIPTION OF THE DRAWINGS

FIG. 10 is a schematic diagram showing a structure of a play list;

DESCRIPTION OF THE PREFERRED EMBODIMENTS

Embodiments of the invention will be hereinafter explained in detail with reference to the accompanying drawings.

Figure 1:
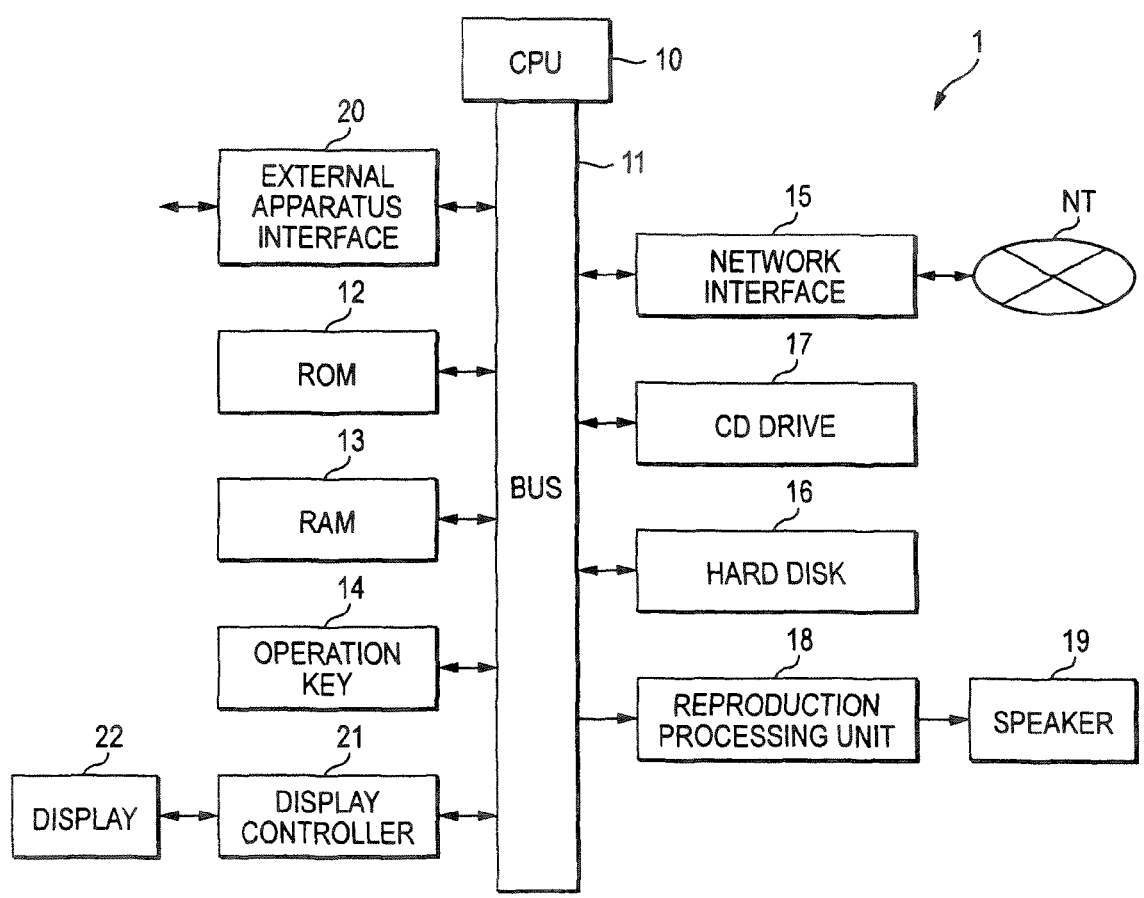
FIG. 1 is a block diagram showing a circuit configuration of a data recording and reproducing apparatus according to an embodiment of the invention.

In FIG. 1, reference numeral 1 denotes a data recording and reproducing apparatus as a whole. A central processing unit (CPU) 10 reads out various programs such as a music selection program and a list correction program from a read only memory (ROM) 12 via a bus 11. The central processing unit 10 collectively controls the entire data recording and reproducing apparatus 1 and executes various kinds of processing by expanding the programs in a random access memory (RAM) 13 and executing the programs. Consequently, when an acquisition request for music data delivered from a music delivery server (not shown) on a network NT is inputted by a user via an operation key 14 provided in a housing or the like of the data recording and reproducing apparatus 1, the central processing unit 10 transmits a request signal for requesting delivery of the music data to the music delivery server via a network interface 15. As a result, when the music data requested is transmitted from the music delivery server via the network NT, the central processing unit 10 receives the music data via the network interface 15 and records the music data in a hard disk 16. The music delivery server also delivers, together with the music data requested, music related information such as a song name and an artist name related to music based on the music data, an album name of an album in which the music is recorded, a genre name of a genre to which the music belongs, and music identification information peculiar to the music data to the data recording and reproducing apparatus 1 as music related information data. Therefore, when the delivery of the music data by the music delivery server is used, the central processing unit 10 receives, via the network interface 15, the music related information data transmitted from the music delivery server together with the music data and records the music related information data in the hard disk 16.

When a command for recording of music data is inputted by the user via the operation key 14 in a state in which a compact disc (CD) is inserted in a CD drive 17, the central processing unit 10 reads out the music data recorded in a music data recording area of the CD using the CD drive 17 and records the music data in the hard disk 16. A management data recording area is also provided on a data recording surface of the CD in addition to the music data recording area. Management data called table of contents (TOC) such as a reproduction time for the respective music data, an order of reproduction, and a reproduction start position in the music data recording area for managing music data recorded in the music recording area are recorded in the management data recording area. Therefore, when the central processing unit 10 reads out the music data from the music data recording area of the CD using the CD drive 17, the central processing unit 10 also reads out the management data from the management data recording area of the CD. The central processing unit 10 generates management information peculiar to the CD on the basis of the management data and transmits the management information generated to a disk information providing server (not shown) on the network NT via the network interface 15. When plural music data recorded in the CD and music related information data related to the music data, respectively, are collectively returned from the disk information providing server as disk information, the central processing unit 10 receives the disk information and records the disk information received in the hard disk 16. In this way, the central processing unit 10 can acquire and hold plural music data using the CD and the music delivery server on the network NT.

When a command for reproduction of music data recorded in the hard disk 16 is inputted by the user via the operation key 14, the central processing unit 10 reads out the music data from the hard disk 16 and sends the music data read out to a reproduction processing unit 18. Consequently, the reproduction processing unit 18 applies digital processing such as decode processing to the music data given from the central processing unit 10 and, then, applies analog processing such as digital-analog conversion processing and amplification processing to the music data and sends a music signal obtained to a speaker 19 to cause the speaker 19 to output music based on the music signal. Moreover, it is possible to connect an external apparatus (not shown) such as a portable player to the data recording and reproducing apparatus 1 via an external apparatus interface 20 such as a universal serial bus (USB) interface. Therefore, when a command for transfer of music data is inputted by the user via the operation key 14, the central processing unit 10 reads out the music data from the hard disk 16 and transfers the music data read out to the external apparatus via the external apparatus interface 20. This makes it possible to record the music data in the external apparatus.

The central processing unit 10 sends display data based on results of execution of the various programs read out from the ROM 12 (e.g., acquisition, reproduction, recording, and transfer of the music data) to a display controller 21. The display controller 21 displays a screen based on the display data given from the central processing unit 10 on a display 22. Consequently, the central processing unit 10 can cause the user to visually recognize various screens concerning the acquisition, the reproduction, the recording, the transfer, and the like of the music data via the display 22.

Figures 2, 3:
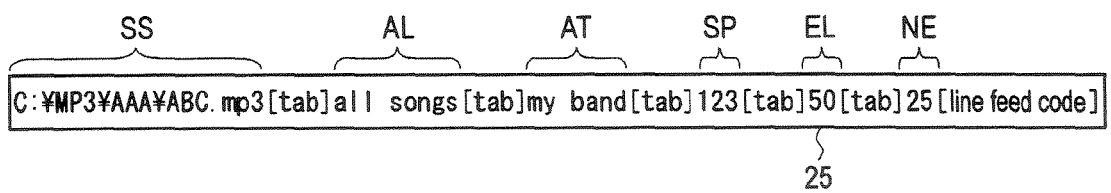
FIG. 2 is a schematic diagram showing three kinds of items for indicating impressions of music.
FIG. 3 is a schematic diagram showing music analysis information.

In addition to such a constitution, in the case of the data recording and reproducing apparatus 1, when music data is recorded in the hard disk 16, the central processing unit 10 analyzes the music data with frequency analysis or the like. The central processing unit 10 digitizes, on the basis of a result of the analysis, three kinds of items such as speed, a tone, and an age, for representing an impression of each piece of music based on the music data and obtains first to third impression item values. As shown in FIG. 2, the speed among the three kinds of items for representing impressions music indicates what kind of feeling ranging from slow feeling to fast feeling the music has. As a value obtained by digitizing the speed is smaller, the value indicates music having slower feeling. As the value is larger, the value indicates music having faster feeling. The tone among the three kinds of items indicates what kind of feeling ranging from analog feeling to digital feeling the music has. As a value obtained by digitizing the tone is smaller, the value indicates music having more analog feeling. As the value is larger, the value indicates more digital feeling. Moreover, the age among the three kinds of items indicates what kind of feeling ranging from old feeling to new feeling the music has. As a value obtained by digitizing the age is smaller, the value indicates music having older feeling. As the value is larger, the value indicates music having newer feeling.

In this way, when the first to the third impression item values are obtained based on the music data recorded in the hard disk 16, the central processing unit 10 generates music analysis information 25 for each piece of music shown in FIG. 3 using these impression item values together with the music related information data. The music analysis information 25 for each piece of music includes music identification information SS capable of identifying music data analyzed, an album name AL of an album in which the music is recorded, an artist name AT, a first impression item value SP obtained by digitizing speed serving as an item, a second impression item value EL obtained by digitizing a toner serving as an item, and a third impression item value NE obtained by digitizing an age serving as an item. The music identification information SS of the music analysis information 25 is, for example, a path indicating a recording location of the music data analyzed and music identification information included in the music related information data. When the music analysis information 25 is generated, the central processing unit 10 records the music analysis information 25 in the hard disk 16.

Figure 4:
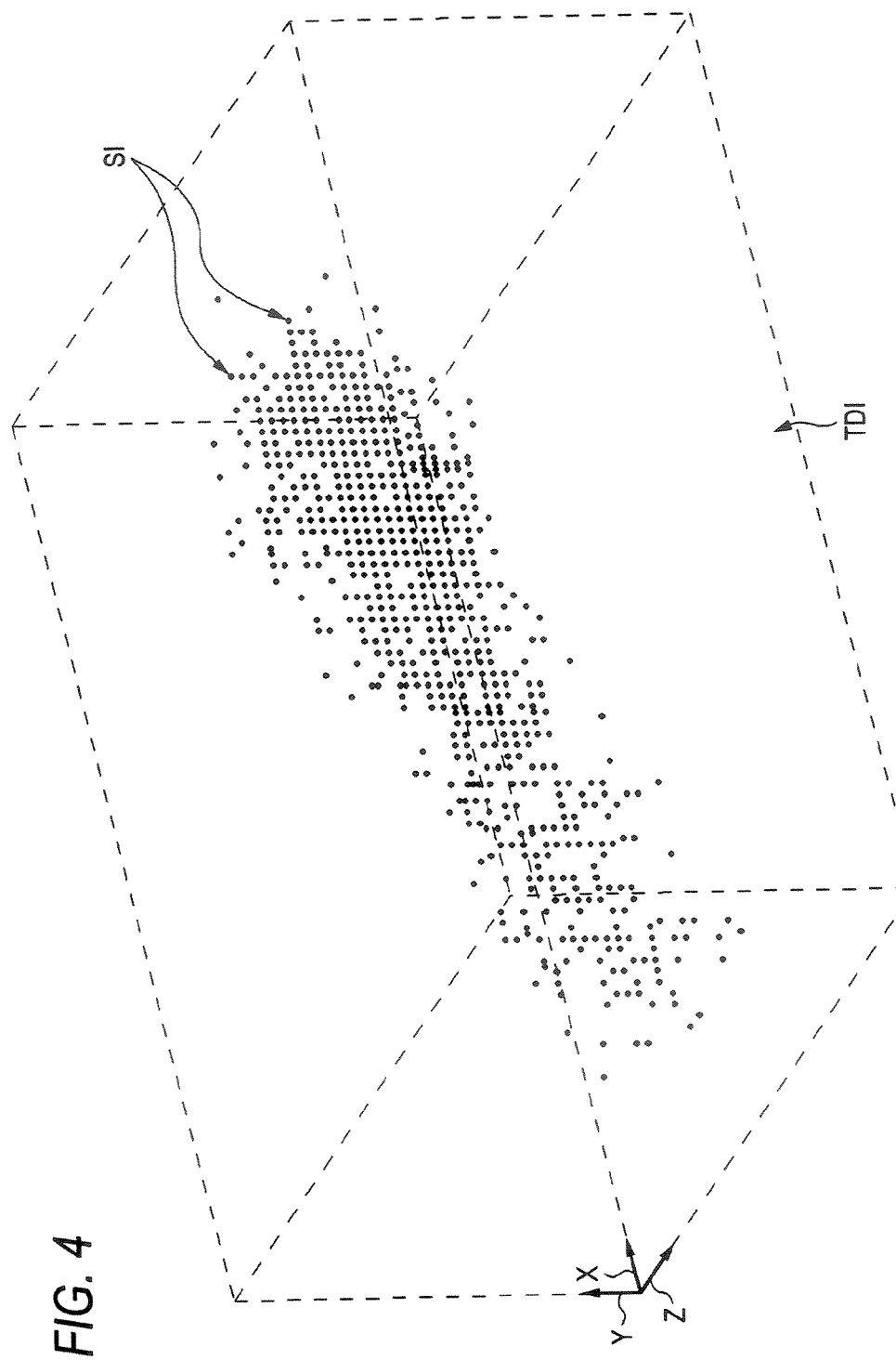
FIG. 4 is a schematic diagram showing a structure of a three-dimensional space image.

In this state, when a music selection request is inputted by the user via the operation key 14, the central processing unit 10 reads out all the pieces of music analysis information 25 recorded in the hard disk 16. In this case, as shown in FIG. 4, the central processing unit 10 directly sets a set of the first to the third impression item values SP, EL, and NE included in the respective pieces of music analysis information 25 as three-dimensional space coordinates based on three axes (i.e., an X axis, a Y axis, and a Z axis) orthogonal to one another and an intersection of three axes (i.e., the origin). In other words, among the set of the first to the third impression item values SP, EL, and NE, for example, the central processing unit 10 sets the first impression item value SP as an X coordinate, sets the second impression item value EL as a Y coordinate, and sets the third impression item value NE as a Z coordinate. The central processing unit 10 converts a three-dimensional space image TDI obtained by arranging music indicators IS of a star shape (or a dot shape) indicating pieces of music, respectively, on these plural three-dimensional space coordinates into a music selection image formed by a two-dimensional plane image. The two-dimensional plane image is obtained by projecting the three-dimensional space image on a two-dimensional plane (in this case, an XY plane) as if the XY plane side is viewed from a predetermined viewpoint in the Z axis direction (hereinafter specifically referred to as an initial viewpoint) as an initial state (i.e., such that a line of sight from the initial viewpoint is perpendicular to the XY plane).

In the three-dimensional space image TDI, since the first to the third impression item values SP, EL, and NE are directly set as the three-dimensional space coordinates, these three-dimensional space coordinates serve as music impression values that cover the three kinds of items and accurately represent impressions of music. In the three-dimensional space image TDI, since the music indicators SI are arranged on these plural three-dimensional space coordinates, respectively, the music indicators SI indicating pieces of music having similar impressions are arranged to be close to one another. In the three-dimensional space image TDI, since the first to the third impression item values SP, EL, and NE are directly set as the three-dimensional space coordinates, among the three axes orthogonal to one another, the X axis corresponds to the speed among the three kinds of items representing impressions of music. The Y axis corresponds to the tone among the three kinds of items. The Z axis corresponds to the age among the three kinds of items. In the three-dimensional space image TDI, as a value of the X coordinate is smaller, the value indicates music having slower feeling. As a value of the X coordinate is larger, the value indicates music having faster feeling. As a value of the Y coordinate is smaller, the value indicates music having more analog feeling. As a value of the Y coordinate is larger, the value indicates music having more digital feeling. As a value of the Z coordinate is smaller, the value indicates music having older feeling. As a value of the Z coordinate is larger, the value indicates music having newer feeling. Therefore, in the three-dimensional space image TDI, the music indicators SI arranged on the three-dimensional space coordinates formed by the first to the third impression item values SP, EL, and NE cause, according to arrangement positions thereof, the user to intuitively recognize feeling of pieces of music corresponding to the music indicators SI.

Figure 5:
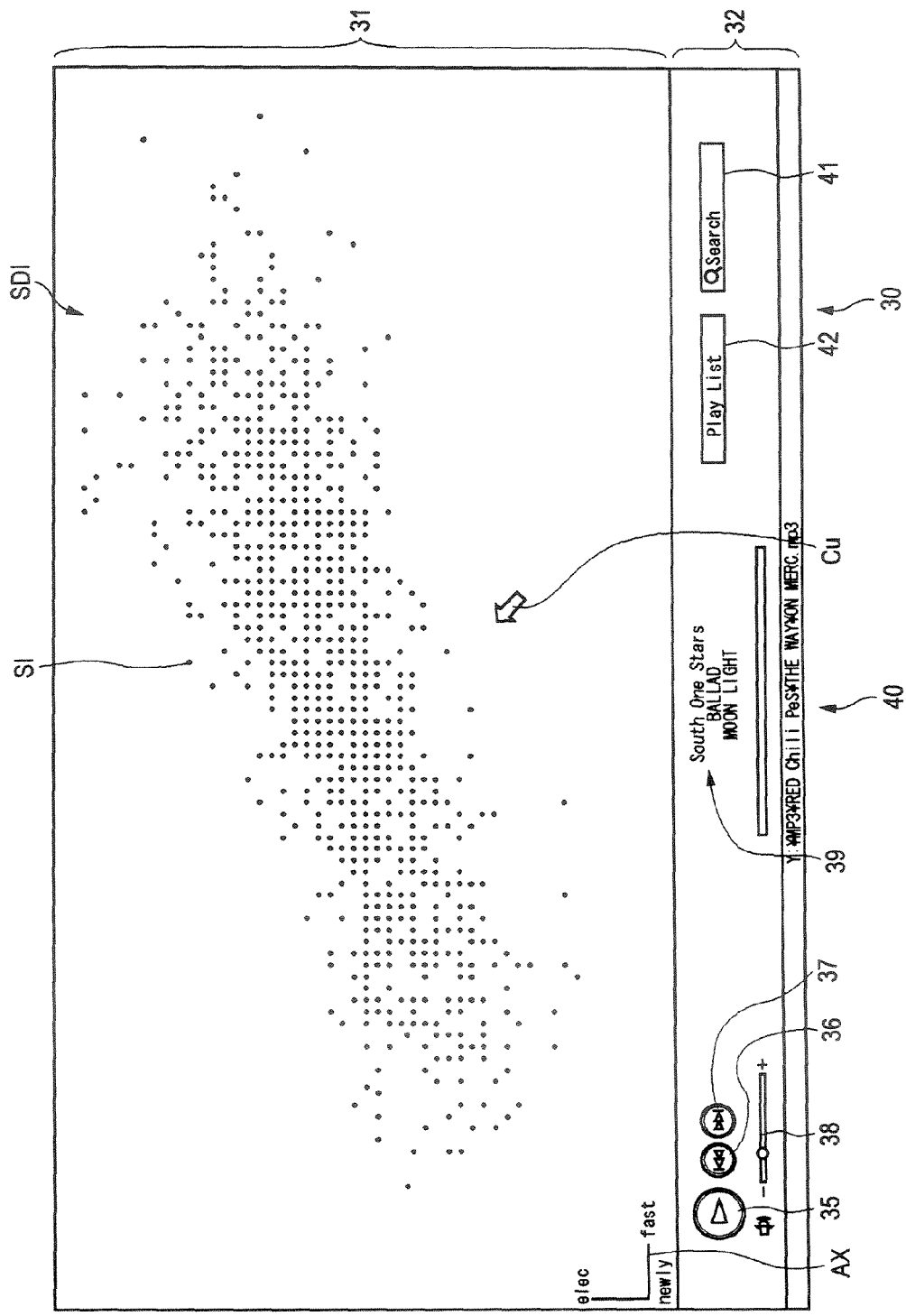
FIG. 5 is a schematic diagram showing a structure of a music search screen.

When the three-dimensional space image TDI is converted into the music selection image formed by the two-dimensional plane image, the central processing unit 10 generates music search screen data using the music selection image. The central processing unit 10 sends the music search screen data generated to the display 22 via the display controller 21 to display a music search screen 30 shown in FIG. 5, which is based on the music search screen data, on the display. In this case, the music search screen 30 has a music selection area 31 and an operation area 32. A music selection image SDI formed by the two dimensional plane image is displayed in the music selection area 31. A projection axis image AX obtained by also projecting the three axes forming a reference of the original three-dimensional space image TDI as a part of the music selection image SDI on the two-dimensional plane as if the XY plane side is viewed from the initial viewpoint is displayed in the music selection area 31. An indicator (hereinafter referred to as cursor) Cu for indicating the music indicators SI is also displayed over the music selection image SDI. In addition, as a part of the projection axis image AX, for notification of impressions of music, characters "fast" indicating music having fast feeling are displayed at the tip of the X axis, characters "elec" indicating music having digital feeling are displayed at the tip of the Y axis, and characters "newly" indicating music having new feeling are displayed at the tip of the Z axis. Consequently, in the music selection image SDI, these characters for notification of impressions displayed as a part of the projection axis image AX can cause the user to remind that, as a value of the X coordinate is smaller, the music indicators SI indicating music having slower feeling are located and, as a value of the X coordinate is larger, the music indicators SI indicating music having faster feeling are located, as a value of the Y coordinate is smaller, the music indicators SI indicating music having more analog feeling are located and, as a value of the Y coordinate is larger, the music indicators SI indicating music having more digital feeling are located, and as a value of the Z coordinate is smaller, the music indicators SI indicating music having older feeling are located and, as a value of the Z coordinate is larger, the music indicators SI indicating music having newer feeling are located.

On the other hand, in the operation area 32 of the music search screen 30, a playback start button 35 for controlling playback of music selected on the music selection image SDI, a music return button 36, a music forward button 37, and a playback-position display section 38 that indicates a playback position of music are provided. In addition, in the operation area 32, a playback-music-information display section 39 in which information such as a song name, an album name, and an artist name (hereinafter referred to as music information) for notifying a type of music being played is displayed on the basis of music related information data and an indicated-music-information display section 40 in which music information corresponding to the music indicator SI indicated by the cursor Cu is displayed are provided. Moreover, in the operation area 32, a search-condition input section 41 for inputting search conditions (e.g., an artist name, an album name, a genre name, etc.) in searching music is also provided. Furthermore, in the operation area 32, a list creation button 42 for creating a play list that defines a playback order of plural pieces of music is also provided.

In the case in which the music search screen 30 is displayed on the display 22, when a command for movement of the cursor Cu is inputted by the user via the operation key 14, the central processing unit 10 arbitrarily moves the cursor Cu on the music selection image SDI in response to the command. In this case, when, for example, the tip of the cursor Cu being moved is placed on the music indicator SI, the central processing unit 10 displays music information corresponding to the music indicator SI, on which the cursor Cu is placed, in the indicated-music-information display section 40. When a rotation command is inputted by the user via the operation key 14 together with a rotation angle for rotating the three-dimensional space image TDI forming the basis of the music selection image SDI, the central processing unit 10 sets three-dimensional space coordinates on which the respective music indicators SI are arranged in the three-dimensional space image TDI as (x, y, z). The central processing unit 10 sets the rotation angle around the X axis, which is instructed as an angle of rotation for the three-dimensional space image TDI, as θ1 and sets a rotation angle around the Y axis as θ2. The central processing unit 10 calculates an X coordinate of the respective music indicators SI on the music selection image SDI formed by the two-dimensional plane image according to Equation (1).

$$X = x \times \cos(\theta 2) - z \times \sin(\theta 2) \quad (1)$$

In addition, the central processing unit 10 calculates a Y coordinate of the respective music indicators SI on the music selection image SDI formed by the two-dimensional plane image according to Equation (2).

$$Y = (x \times \sin(\theta 2) + z \times \cos(\theta 2)) \times \sin(\theta 1) - y \times \cos(\theta 1) \quad (2)$$

Figure 6:
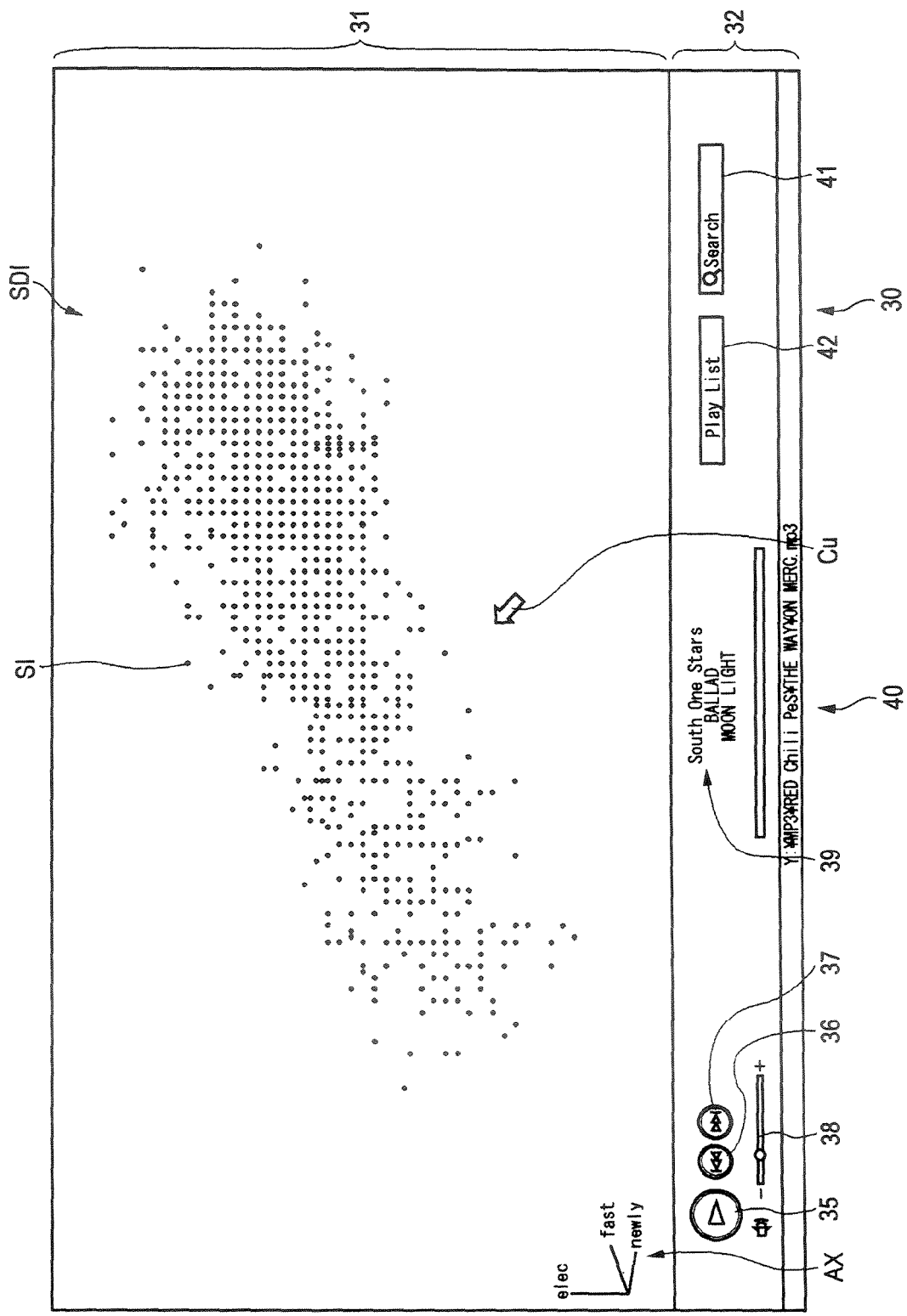
FIG. 6 is a schematic diagram for explaining rotation of the three-dimensional space image.

As shown in FIG. 6, the central processing unit 10 generates the music selection image SDI in which the music indicators SI corresponding to the X coordinate and the Y coordinate on the two-dimensional plane image calculated in this way (hereinafter collectively referred to as two-dimensional plane coordinates), respectively, are arranged on the two-dimensional plane coordinates. The central processing unit 10 displays the music selection image SDI in the music selection area 31 of the music search screen 30. The central processing unit 10 is instructed by the user to rotate the three-dimensional space image TDI and change a viewpoint for viewing the three-dimensional space image TDI. Then, according to the instruction, the central processing unit 10 converts the three-dimensional space image TDI into the music selection image SDI formed by the two-dimensional plane image obtained by rotating the three-dimensional space image TDI to be viewed from the viewpoint instructed to be changed and projecting the three-dimensional space image TDI on the two-dimensional plane. The central processing unit 10 displays the music selection image SDI in the music selection area 31. Consequently, when the central processing unit 10 converts the three-dimensional space image TDI into the music selection image SDI formed by the two-dimensional plane image viewed from any viewpoint, even if at least two music indicator SI are arranged side by side along a direction of a line of sight and the music indicator SI on the rear side is invisible behind the music indicator SI in front, the central processing unit 10 can also show any music indicators SI by further rotating the three-dimensional space image TDI to change the viewpoint. When the central processing unit 10 changes the viewpoint of the three-dimensional space image TDI according to the instruction of the user, the central processing unit 10 also rotates the three axes forming a reference of the three-dimensional space image TDI into the projection axis image AX obtained by rotating the three axes to be viewed with the viewpoint changed and projecting the three axes on the two-dimensional plane. Consequently, even if the music selection image SDI is rotated as the three-dimensional space image TDI in the music selection area 31 of the music search screen 30, the central processing unit 10 can cause the user to easily recognize what kind of impression pieces of music indicated by the respective music indicators SI have according to the projection axis image AX in the music selection image SDI.

The data recording and reproducing apparatus 1 causes the user to depress, for example, an arrow key serving as the operation key 14 and, while the arrow key is depressed, continuously increases or decreases a rotation angle instructed by the user. Therefore, while the arrow key is depressed by the user, the central processing unit 10 repeatedly executes the calculations of Equation (1) and Equation (2) according to an instructed value of the rotation angle sequentially changing and gradually rotates the three-dimensional space image TDI on the basis of results of the calculations. The central processing unit 10 reflects the change of the viewpoint on the music selection image SDI on a real time basis. In other words, the central processing unit 10 gradually rotates the music selection image SDI as the three-dimensional space image TDI in the music selection area 31 of the music search screen 30 according to a command for rotation of the three-dimensional space image TDI given by the user. Consequently, the central processing unit 10 can cause the user to easily select a viewpoint for viewing the three-dimensional space image TDI according to how the music indicator SI indicating music having impression of the user's preference is seen. The central processing unit 10 rotates the three-dimensional space image TDI to be viewed from a viewpoint different from the initial viewpoint and reflects such rotation on the music selection image SDI in the music selection area 31 of the music search screen 30. After this, in a state in which, for example, the cursor Cu is placed on the projection axis image AX, when the projection axis image AX is selected (equivalent to click operation) by the user, the central processing unit 10 rotates the three-dimensional space image TDI to be viewed from the initial viewpoint again in accordance with an image projection initialization command inputted in response to the selection. The central processing unit 10 reflects the rotation on the music selection image SDI in the music selection area 31 of the music search screen 30. Consequently, even if the music selection image SDI is appropriately rotated as the three-dimensional space image TDI in the music selection area 31 of the music search screen 30 in response to a request of the user, the central processing unit 10 can easily return the music selection image SDI rotated to the original state.

When an enlarged display command is inputted by the user via the operation key 14, the central processing unit 10 applies enlargement processing to the music selection image SDI at a predetermined enlargement ratio with, for example, a position on which the tip of the cursor Cu is placed (hereinafter referred to as magnification conversion center position) as a reference. The central processing unit 10 sets the magnification conversion center position in the center position of the music selection area 31 (hereinafter referred to as area center position) to display an enlarged portion of the music selection image SDI in the music selection area 31 of the music search screen 30. In this way, every time enlarged display is requested by the user, the central processing unit 10 sequentially display the music selection image SDI in an enlarged state in the music selection area 31 of the music search screen 30. When a reduced display command is inputted by the user via the operation key 14, the central processing unit 10 applies reduction processing to the music selection image SDI at a predetermined reduction ratio with the magnification conversion center position as a reference. The central processing unit 10 sets the magnification conversion center position in the area center position to display the music selection image SDI in the music selection area 31 of the music search screen 30. In this way, every time reduced display is requested by the user, the central processing unit 10 sequentially displays the music selection image SDI in the music selection area 31 of the music search screen 30. Consequently, the central processing unit 10 can change the respective music indicators SI to a size of the user's preference easily recognized by the user and present the music selection screen SDI.

Figure 7:
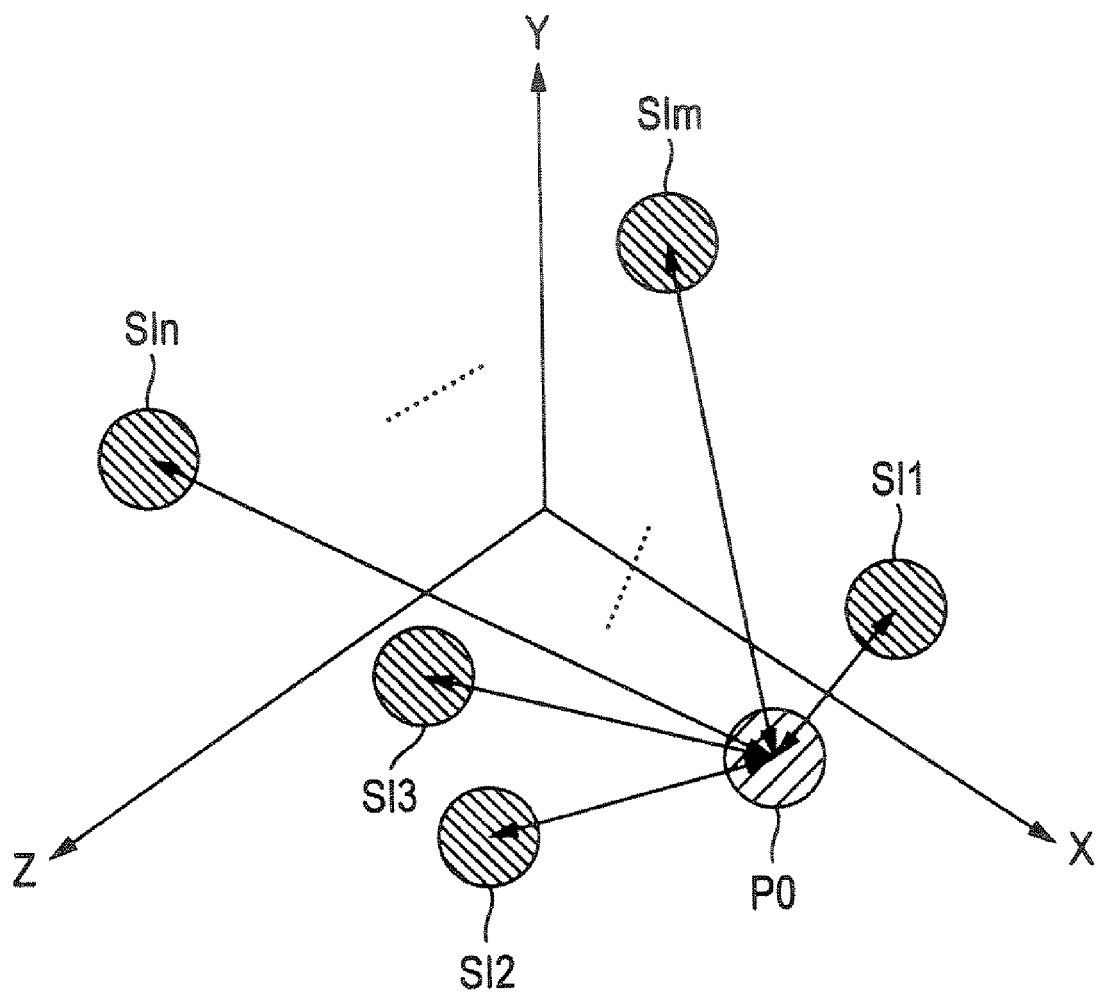
FIG. 7 is a schematic diagram for explaining selection of music.

While a display state of the music selection image SDI is appropriately changes in the music selection area 31 of the music search screen 30 in this way, when a dot is arbitrarily selected by the cursor Cu on the music selection image SDI of the music search screen 30 according to operation of the operation key 14 by the user, the central processing unit 10 detects a two-dimensional plane coordinate in a position overlapping the tip of the cursor Cu in the music selection image SDI at this point (hereinafter referred to as selected position). In this case, the central processing unit 10 converts the two-dimensional plane coordinate in the selected position detected on the music selection image SDI into a three-dimensional space coordinate in the three-dimensional space image TDI (i.e., closest to a viewpoint at that point in the three-dimensional space image TDI) (hereinafter specifically referred to as selected position space coordinate) according to calculations reversible with Equations (1) and (2). As shown in FIG. 7, the central processing unit 10 calculates space distances between a selected position space coordinate in the selected position expanded from the music selection image SDI into the three-dimensional space image TDI (hereinafter referred to as expanded selected position) and three-dimensional space coordinates on which the respective music indicators SI1 to S1$n$ are arranged and compares the space distances. Consequently, the central processing unit 10 selects music indicators SI1 to SIm by a reference selection number (e.g., ten) selected in advance in order from a music indicator in a position closest to the expanded selected position P0 to music indicators in positions far from the expanded selected position P0. The central processing unit 10 determines that a piece of music corresponding to one music indicator SI1 in the position closest to the expanded selected position P0 among pieces of music corresponding to the reference selection number of music indicators SI1 to SIm selected, respectively, is a piece of music arbitrarily selected by the user according to an impression of the user's preference (hereinafter referred to as a piece of selected music). The central processing unit 10 determines that plural pieces of music corresponding to the remaining plural music indicators SI2 to SIm are pieces of candidate music extremely highly likely to be selected according to impressions of the user's preferences (hereinafter referred to as candidate music), respectively.

Figure 8:
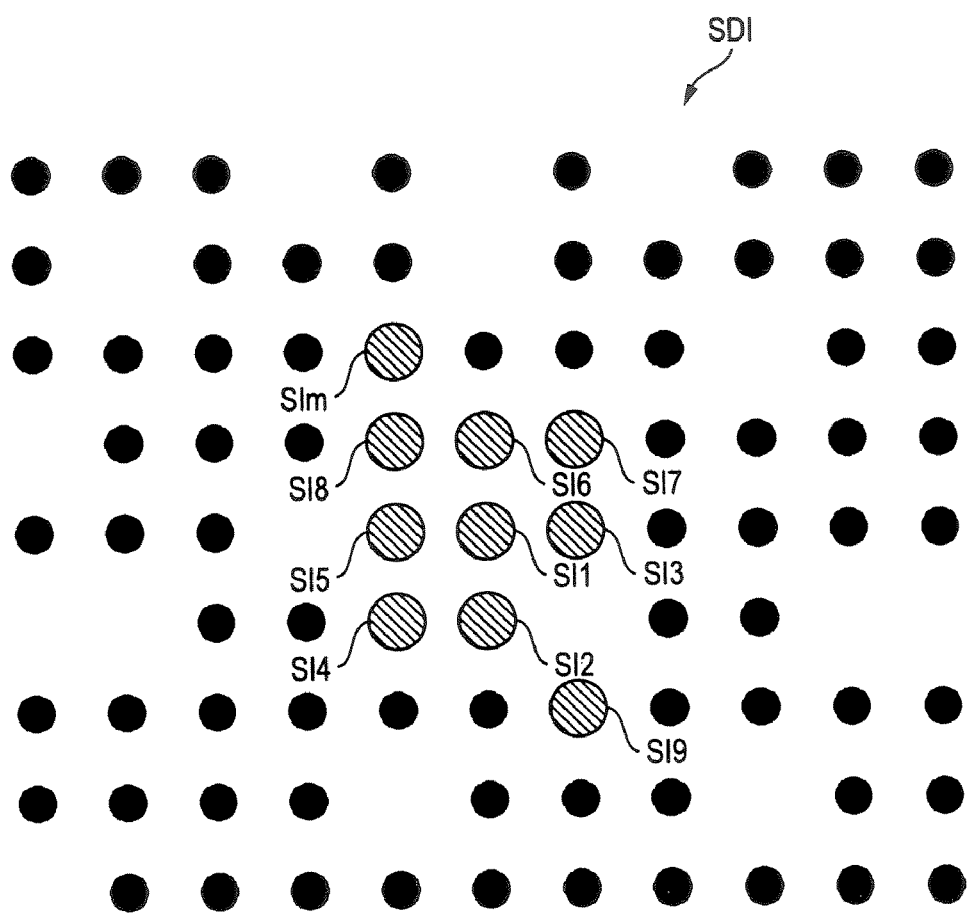
FIG. 8 is a schematic diagram for explaining presentation of a piece of selected music and pieces of candidate music.
Figure 9:
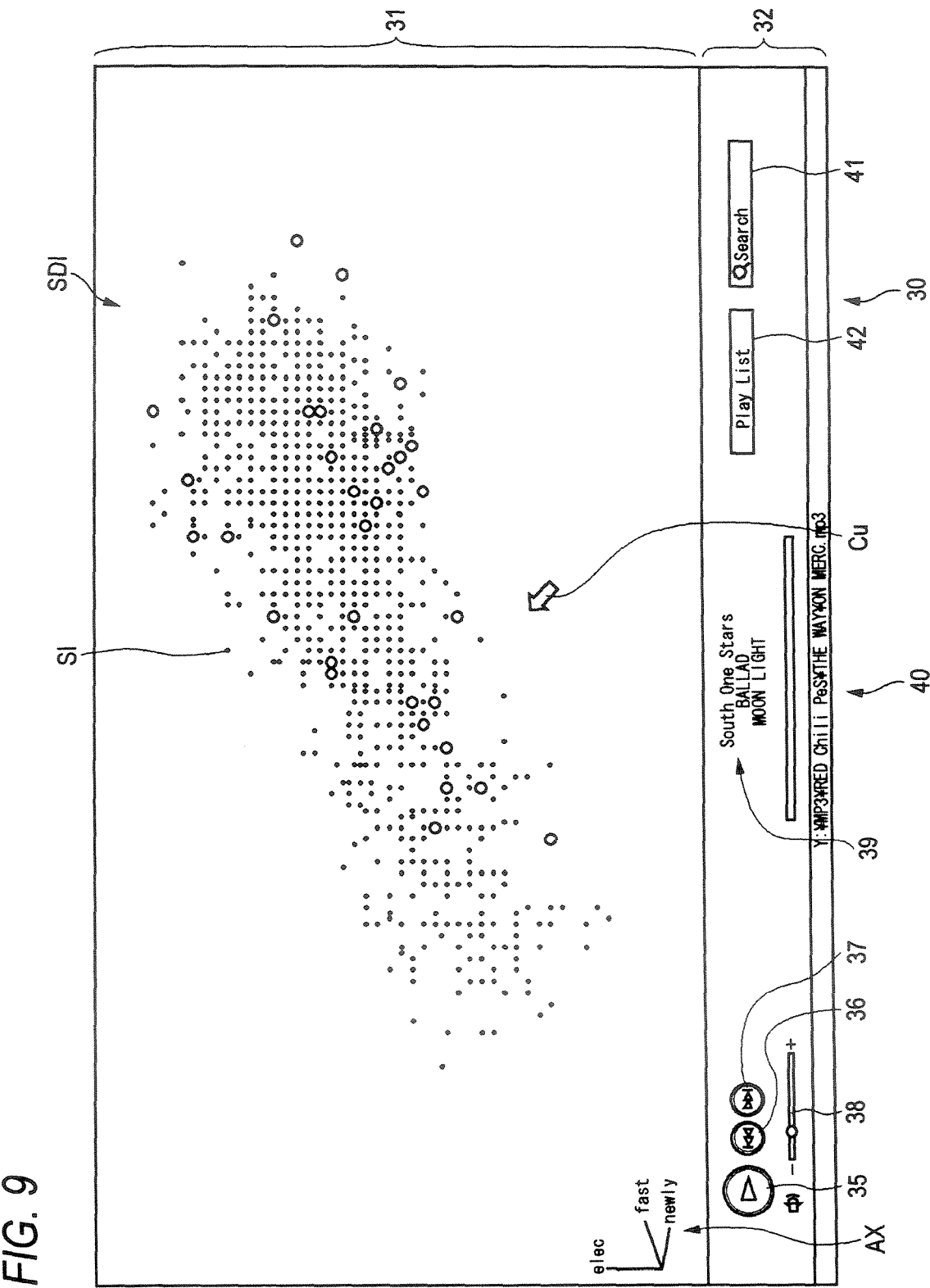
FIG. 9 is a schematic diagram for explaining presentation of a result of search for music by the music search screen.

As shown in FIG. 8, the central processing unit 10 changes the music indicator SI1 indicating the piece of selected music on the music selection image SDI of the music search screen 30 into a display state different from the other plural music indicators SI2 to SIn (e.g., a different display color). The central processing unit 10 also changes the plural music indicators SI2 to SIm corresponding to the plural pieces of candidate music to a display state different from the other plural music indicators SIn around the music indicators SI2 to SIm (e.g., a different display color). Consequently, the central processing unit 10 can present the piece of selected music selected by the user on the music selection image SDI and the plural pieces of candidate music selected as the selection candidates by the selection to the user together with impressions of the piece of selected music and the plural pieces of candidate music using the plural music indicators SI1 to SIm in the display states different from the state of the other music indicators.

In addition, when the piece of selected music and the plural pieces of candidate music are determined in this way, the central processing unit 10 sequentially reproduces music data, for example, in an order from the piece of selected music corresponding to the music indicator SI1 in the position closest to the expanded selected position P0 to the pieces of candidate music corresponding to the music indicators SI2 to SIm in positions far from the expanded selected position P0 and causes the user to listen to the pieces of music. Consequently, the central processing unit 10 can cause the user to actually listen to the piece of selected music and the candidate music to check whether the piece of selected music and the candidate music are music matching (or close to) impressions of the user's preferences. When the music data of the piece of selected music and the plural pieces of candidate music are reproduced, respectively, the central processing unit 10 plays only climax portions selected in advance and causes the user to listen to the climax portions in order. Consequently, the central processing unit 10 can surely cause the user to check in a relatively short time whether the piece of selected music and the plural pieces of candidate music are pieces of music having impressions of the user's preferences.

The central processing unit 10 changes one of the music indicators SI1 to SIm corresponding to a piece of selected music or a piece of candidate music being played to a display state dedicated to playback (e.g., a separate display color selected for playback only). The central processing unit 10 displays music information of the piece of selected music or the piece of candidate music being played on a playing-music-information display section 39 of the music search screen 30. Consequently, the central processing unit 10 can show the user a song name and the like of the piece of selected music or the piece of candidate music while presenting an impression of the piece of selected music and the piece of candidate music being played. In this case, when the playback start button 35 is depressed in the operation area 32 of the music search screen 30 by the user via the operation key 14 and a command for playback of one piece of music is inputted in response to the depression of the button, the central processing unit 10 plays the piece of selected music or the piece of candidate music being played at that point from the top position of the music again. Consequently, when the central processing unit 10 continuously plays the climax portions of the piece of selected music and the plural pieces of candidate music automatically, the central processing unit 10 can appropriately switch playback of only climax portions of a desired piece of selected music or plural pieces of candidate music to playback of the entire music and cause the user to check an impression of the entire music.

When the music return button 36 is depressed by the user via the operation key 14 and a playing music return command is inputted in response to the depression of the button, for example, during playback of a climax portion of a piece of candidate music or the entire music, the central processing unit 10 stops the playback of the climax portion of the piece of candidate music or the entire music at that point and plays a climax portion of the piece of selected music or the piece of candidate music played immediately preceding the climax portion. Consequently, when the user listens to the piece of candidate music being played, even if the user requests the central processing unit 10 to compare an impression of the piece of candidate music being played with an impression of an immediately preceding piece of selected music or candidate music, the central processing unit 10 can promptly cause the user to compare impressions of the pieces of music easily in response to the request. When a playing music return command is inputted during playback of a climax portion of the piece of selected music or the entire music, the central processing unit plays the climax portion of the piece of selected music from the beginning again. Therefore, only when a piece of selected music is played, the central processing unit 10 can repeatedly play the piece of selected music appropriately to surely cause the user to check an impression of the piece of selected music. When the music forward button 37 is depressed by the user via the operation key 14 and a playing music forward command is inputted in response to the depression of the button during playback of a climax portion of a piece of selected music or a piece of candidate music or the entire music, the central processing unit 10 stops the playback of the climax portion of the piece of selected music or the piece of candidate music or the entire music at that point and plays a climax portion of a piece of candidate music to be played next. Consequently, when an impression of a piece of selected music or a piece of candidate music is checked immediately after playback of the piece of selected music or the piece of candidate music is started, the central processing unit 10 can prevent the piece of selected music or the piece of candidate music from being continuously played in vain.

When a search command is inputted according to operation of the operation key 14 by the user in a state in which search conditions are inputted in the search condition input unit 41 in the operation area 32 of the music search screen 30, the central processing unit 10 searches for one or plural pieces of music meeting the search conditions inputted by the user on the basis of the search conditions and contents of plural music related information data related to music based on plural music data. The central processing unit 10 determines one or plural music indicators SI corresponding to the one or plural pieces of music found on the basis of music identification information included in the music related information data related to the one or plural pieces of music found and the music analysis information 25. The central processing unit 10 changes the one or plural pieces of music indicators SI determined to a display state (e.g., a display color) different from that of the other plural music indicators SI in the music selection image SDI of the music search screen 30. Consequently, the central processing unit 10 can easily and accurately present what kinds of impressions one or plural pieces of music or artists, albums, genres, and the like designated by the user as search conditions have. Even when a piece of selected music is arbitrarily selected by the user in the music selection image SDI or a search result is presented, the central processing unit 10 can rotate the music selection image SDI in the same manner as described above and perform enlarged display or reduced display. Therefore, the central processing unit 10 can easily cause the user to check how many pieces of music have impressions close to those of the piece of selected music and the music found.

When the list creation button 42 is depressed by the user in the operation area 32 of the music search screen 30 via the operation key 14 in a state in which a piece of selected music and plural pieces of candidate music are determined in the music selection image SDI of the music search screen 30 and a play list creation command is inputted in response to the depression of the button, the central processing unit 10 creates a play list 50 shown in FIG. 10 in which the piece of selected music and the plural pieces of candidate music are registered. In this case, the central processing unit 10 issues identification information (hereinafter referred to list identification information) PLI peculiar to the play list 50 and adds the list identification information PLI to the play list 50. The central processing unit 10 also registers a selected position space coordinate of the expanded selected position P0 indicating impressions of the user's preferences forming a reference in selecting the piece of selected music and the plural pieces of candidate music (i.e., three kinds of impression item values representing impressions of the user's preferences designated by the user on the music selection image SDI; the impressions will be hereinafter referred to as selection reference impression values) in the play list 50. The central processing unit 10 registers the piece of selected music and the plural pieces of candidate music in the play list 50 as the music identification information SS included in the plural pieces of music analysis information 25 corresponding thereto, respectively. In the play list 50, the central processing unit 10 sequentially arranges the plural pieces of music identification information SS, for example, in order from information of a piece of selected music corresponding to the music indicator SI1 in a position closest to the expanded selected position P0 to pieces of candidate music corresponding to the music indicators SI2 to SIm in positions far from the expanded selected position P0. In this way, the central processing unit 10 defines an order of playback of the piece of selected music and the plural pieces of candidate music (e.g., an order for playing the piece of selected music first and sequentially playing the pieces of candidate music) according to the order of the arrangement of the plural pieces of music identification information SS. When the play list 50 is created, the central processing unit 10 records the play list 50 in the hard disk 16 as play list data.

When the play list 50 is created, the central processing unit 10 can cause the user to arbitrarily give a list name, which is identifiable by the user, to the play list 50. Therefore, the central processing unit 50 also records list management information in which the list name and the list identification information PLI are associated with each other in the hard disk 16. Therefore, at the time of reproduction of music data, when a list name is designated by the user and a reproduction command for the music data is subsequently inputted, first, the central processing unit 10 determines the play list 50 to which the list name designated is given using the list management information and reads out the play list 50 from the hard disk 16 as play list data. Consequently, the central processing unit 10 can reproduce plural music data in order in accordance with the play list 50 and, therefor, cause the user to listen to a piece of selected music and plural pieces of candidate music based on the plural music data in order.

In playing a piece of selected music and plural pieces of candidate music using the play list 50, the central processing unit 10 judges whether the piece of selected music and the plural pieces of candidate music registered in the play list 50 are played, respectively. In playing the piece of selected music and the plural pieces of candidate music in accordance with the play list 50, when the piece of selected music and the plural pieces of candidate music are played for a predetermined time selected in advance or more from top positions of the pieces of music, respectively, the central processing unit 10 judges that the piece of selected music and the plural pieces of candidate music have been played. When a music forward command is arbitrarily inputted by the user via the operation key 14 and, therefor, the piece of selected music and the plural pieces of candidate music are not played at all and the playback is switched to a piece of candidate music planned to be played next before the piece of selected music and the plural pieces of candidate music are played for the predetermined time, the central processing unit 10 judges that the piece of selected music and the candidate music have not been played. In this way, the central processing unit 10 counts the numbers of times of playback of the piece of selected music and the plural pieces of candidate music as evaluation values for evaluating how the piece of selected music and the plural pieces of candidate music registered in the play list 50 are close to impressions of the user's preferences. The central processing unit 10 associates, for each play list 50, the numbers of times of playback serving as evaluation values for the piece of selected music and the plural pieces of candidate music with the music identification information SS in order to determine to which pieces of music (i.e., the piece of selected music and the plural pieces of candidate music). The central processing unit 50 also associates the numbers of times of playback with the list identification information PLI of the play list 50 (i.e., the play list 50) to generate information on the numbers of times of playback. The central processing unit 50 records the information in the hard disk 16.

In such a state, when the play list 50 is designated by the user via the operation key 14 and a command for correction of contents for the play list 50 designated is inputted, the central processing unit 10 corrects the contents of the play list 50 designated using information on the number of times corresponding to the play list. The central processing unit 10 can execute processing for correcting contents of the play list 50 according to three kinds of first to third processing methods. In correcting the contents of the play list 50, the central processing unit 10 causes the user to arbitrarily select, for example, the first to the third processing methods for the processing for correcting contents of the play list 50. Therefore, the processing for correcting contents of the play list 50 according to the first to the third processing method will be hereinafter explained in order.

First, when the first processing method is selected by the user in the processing for correcting contents of the play list 50, the central processing unit 10 reads out the play list 50 designated as a correction object from the hard disk 16 as play list data and also reads out information on the number of times of playback corresponding to the play list 50. The central processing unit 10 totals the numbers of times of playback of all pieces of music (i.e., the piece of selected music and the plural pieces of candidate music) registered in the correction object play list 50 on the basis of the information on the number of times of playback. The central processing unit 10 compares a total number of times of playback obtained with a total reference number of times of playback selected in advance. As a result, when the total number of times of playback is equal to or larger than the total reference number of times of playback, the central processing unit 10 can judge that the correction object play list 50 is used for playback of the piece of selected music and the plural pieces of candidate music a relatively large number of times and it is highly likely that the piece of selected music and the plural pieces of candidate music are pieces of music having impressions of the user's preferences. On the other hand, when the total number of times of playback is smaller than the total reference number of times of playback, the central processing unit 10 can judge that the correction object play list 50 is used for playback of the piece of selected music and the plural pieces of candidate music a relatively small number of times and it is highly likely that the piece of selected music and the plural pieces of candidate music are pieces of music having impressions different from the user's preferences.

Therefore, in this case, the central processing unit 10 reads out the music analysis information 25 from the hard disk 16. When the total number of times of playback is equal to or larger than the total reference number of times of playback, the central processing unit 10 changes a reference number of selections, which is a selection area of music, to an increased number of selections larger than this (e.g., twenty). In this state, the central processing unit 10 calculates space distances between the selection reference impression value SSI (i.e., the selected position space coordinate of the expanded selected position P0) included in the correction object play list 50 and three-dimensional space coordinates on which the music indicators SI indicating respective pieces of music are arranged and compares the space distances. According to such comparison, the central processing unit 10 selects the music indicators SI by the increased number of selections again in order from the music indicator SI in the position closest to the expanded selected position P0 indicated by the selection reference impression value SSI (i.e., the selected position space coordinate) to the music indicators SI in the positions far from the expanded selected position P0. The central processing unit 10 determines pieces of music corresponding to the plural music indicators SI selected, respectively, as a piece of selected music and plural pieces of candidate music in the same manner as above. The central processing unit 10 additionally registers plural pieces of candidate music other than a piece of selected music and plural pieces of candidate music registered already among the piece of selected music and the plural pieces of candidate music determined again and corrects the contents of the play list 50. Consequently, the central processing unit 10 sends the play list 50, the contents of which are corrected, to the hard disk 16 as play list data and overwrites the play list data before the content correction with the play list data to record the play list data.

Figure 11:
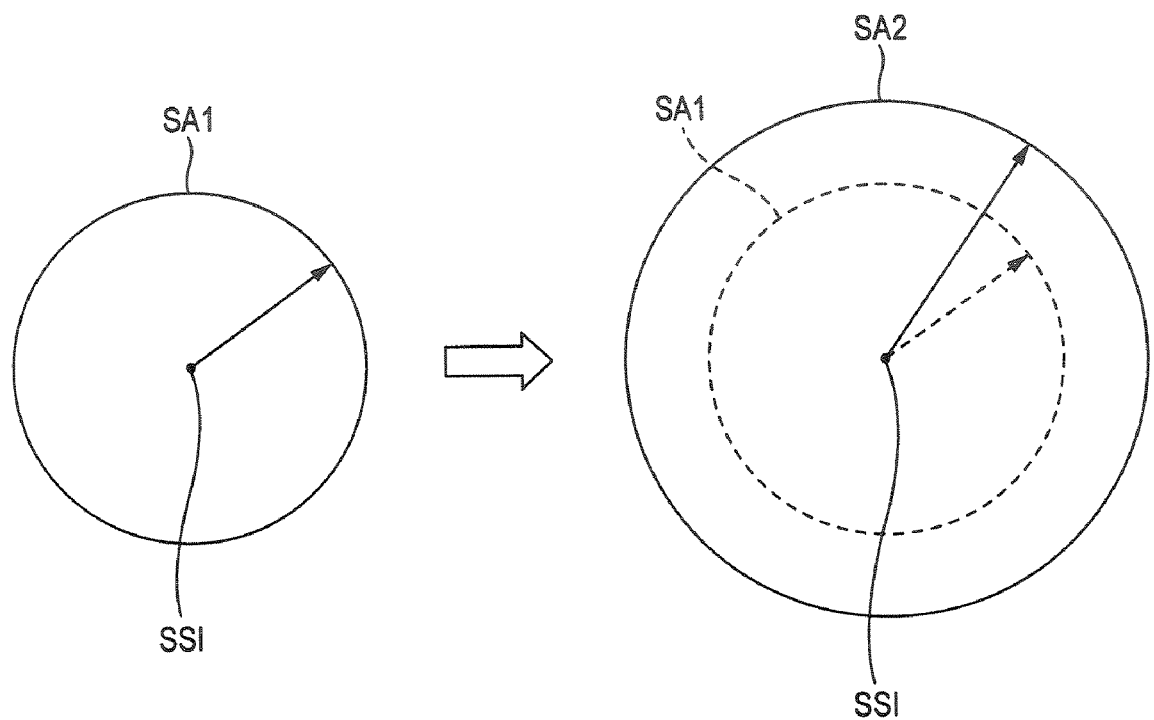
FIG. 11 is a schematic diagram for explaining update of contents of the play list according to a first processing method.

In this way, as shown in FIG. 11, when the piece of selected music and the plural pieces of candidate music registered in the play list 50 are often listened to by the user, the central processing unit 10 changes a spherical selection area SA1, which is set in the three-dimensional space image TDI with the selection reference impression value SSI as the center when the play list 50 is created, to a new selection area SA2 wider than this. The central processing unit 10 additionally selects plural pieces of candidate music having impressions similar to impressions of the user's preferences represented by the selection reference impression value SSI anew in the new selection area SA2 and additionally registers the plural pieces of candidate music in the play list 50. Therefore, when the piece of selected music and the plural pieces of candidate music registered in the play list 50 are often listened to by the user, the central processing unit 10 corrects the contents of the play list 50 and adds pieces of candidate music. Consequently, the central processing unit 10 can cause the user to listen to more pieces of music (i.e., the piece of selected music and the plural pieces of candidate music) matching (or close to) the impressions of the user's preferences.

On the other hand, when the total number of times of playback is smaller than the total reference number of times of playback, the central processing unit 10 changes the reference number of selections, which is the selection area of music, to an reduced number of selections smaller than this (e.g., five). In this state, the central processing unit 10 calculates space distances between the selection reference impression value SSI (i.e., the selected position space coordinate of the expanded selected position P0) included in the correction object play list 50 and three-dimensional space coordinates on which the music indicators SI indicating respective pieces of music are arranged and compares the space distances. According to such comparison, the central processing unit 10 selects the music indicators SI by the reduced number of selections again in order from the music indicator SI in the position closest to the expanded selected position P0 indicated by the selection reference impression value SSI (i.e., the selected position space coordinate) to the music indicators SI in the positions far from the expanded selected position P0. The central processing unit 10 determines pieces of music corresponding to the plural music indicators SI selected, respectively, as a piece of selected music and plural pieces of candidate music in the same manner as above. The central processing unit 10 directly re-registers the piece of selected music and the plural pieces of candidate music determined in the play list 50. The central processing unit 10 deletes (i.e., cancels the registration of) plural pieces of candidate music already registered other than the piece of selected music and the plural pieces of candidate music determined again and corrects the contents of the play list 50. Consequently, the central processing unit 10 sends the play list 50, the contents of which are corrected, to the hard disk 16 as play list data and overwrites the play list data before the content correction with the play list data to record the play list data.

Figure 12:
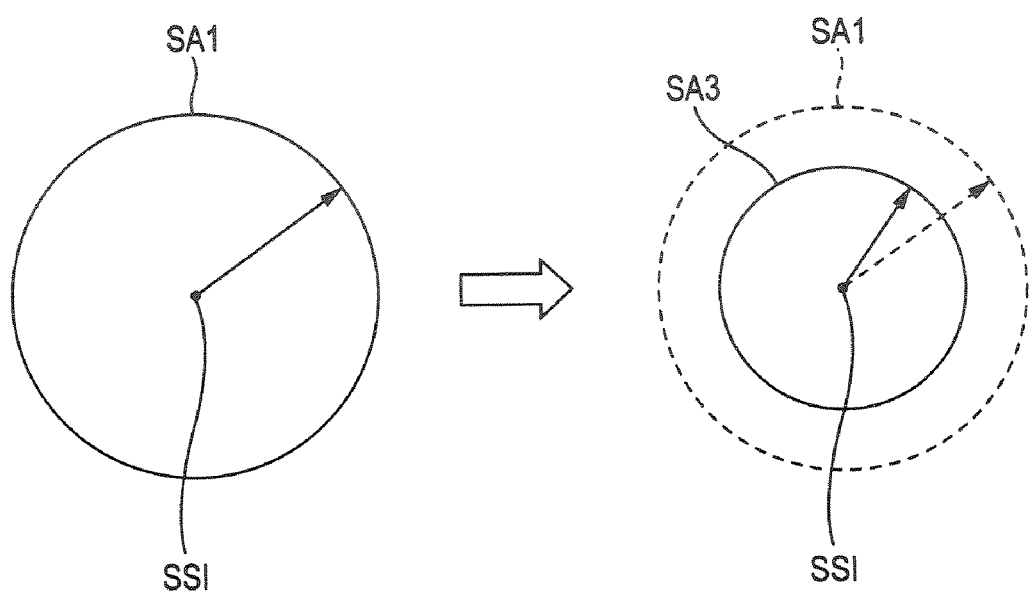
FIG. 12 is a schematic diagram for explaining update of contents of the play list according to the first processing method.

In this way, as shown in FIG. 12, when the piece of selected music and the plural pieces of candidate music registered in the play list 50 are rarely listened to by the user, the central processing unit 10 changes the spherical selection area SA1, which is set in the three-dimensional space image TDI with the selection reference impression value SSI as the center when the play list 50 is created, to a new selection area SA3 narrower than this. The central processing unit 10 leaves the piece of selected music and a part of the pieces of candidate music, which are present in the new selection area SA3, in the play list 50 as they are as pieces of music having impressions as similar as possible to impressions of the user's preferences represented by the selection reference impression value SSI. The central processing unit 10 deletes the other pieces of candidate music excluding the piece of selected music and the part of the pieces of candidate music from the play list 50 as pieces of music having impressions different from the impressions of the user's preference. Therefore, when the piece of selected music and the plural pieces of candidate music registered in the play list 50 are rarely listened to by the user, the central processing unit 10 corrects the contents of the play list 50 and deletes a part of the pieces of candidate music. Consequently, the central processing unit 10 can cause the user to listen to only pieces of music as close as possible to impressions of the user's preferences (i.e., the piece of selected music and the part of the pieces of the candidate music left in the play list 50).

When the second processing method is selected by the user in the processing for correcting contents of the play list 50, the central processing unit 10 reads out the play list 50 designated as a correction object from the hard disk 16 as play list data and also reads out information on the number of times of playback corresponding to the play list 50. The central processing unit 10 compares the numbers of times of playback of respective pieces of music (i.e., the piece of selected music and the plural pieces of candidate music) registered in the correction object play list 50 with an individual reference number of times of playback selected in advance. As a result, concerning pieces of music, the number of times of playback of which is equal to or larger than the individual reference number of times of playback, among the pieces of music registered in the correction object play list 50, the central processing unit 10 can judge that it is highly likely that the pieces of music are pieces of music having impressions of the user's preferences. On the other hand, concerning pieces of music, the number of times of playback of which is smaller than the individual reference number of times of playback, among the pieces of music registered in the correction object play list 50, the central processing unit 10 can judge that it is highly likely that the pieces of music are pieces of music having impressions different from the user's preferences.

Therefore, in this case, the central processing unit 10 reads out the music analysis information 25 from the hard disk 16. In this case, on the basis of the result of the comparison of the number of times of playback of the respective pieces of music registered in the correction object play list 50 and the individual reference number of times of playback and three-dimensional space coordinates on which the music indicators SI indicating these plural pieces of music are arranged, the central processing unit 10 detects three-dimensional space coordinates on which the music indicators SI indicating pieces of music played by the individual reference number of times of playback or more are arranged. The central processing unit 10 corrects the selection reference impression value SSI (i.e., the selected position space coordinate of the expanded selected position P0) included in the correction object play list 50 to be an impression value representing an impression as close as possible to an impression of the user's preference directly using the three-dimensional space coordinates detected or using the three-dimensional space coordinates after weighting the three-dimensional space coordinates according to the numbers of times of playback (i.e., weight is set larger as the number of times of playback is larger). The central processing unit 10 calculates space distances between the selection reference impression value SSI corrected (i.e., a three-dimensional space coordinate; hereinafter referred to as corrected reference impression value) and the three-dimensional space coordinates on which the music indicators SI indicating the respective pieces of music are arranged and compares the space distances. According to such comparison, the central processing unit 10 selects, for example, the music indicators SI by the reference selection number in order from the music indicator SI in a position closest to a corrected selected position indicated by the corrected reference impression value to the music indicators SI in positions far from the corrected selected position again. The central processing unit 10 determines pieces of music corresponding to the plural music indicators SI selected, respectively, as a piece of selected music and plural pieces of candidate music in the same manner as above. The central processing unit 10 deletes (i.e., cancels the registration of) a piece of selected music and plural pieces of candidate music already registered in the correction object play list 50, re-registers the piece of selected music and the plural pieces of candidate music determined in the correction object play list 50, and corrects the contents of the play list 50. Consequently, the central processing unit 10 sends the play list 50, the contents of which are corrected, to the hard disk 16 as play list data and overwrites the play list data before the content correction with the play list data to record the play list data.

Figure 13:
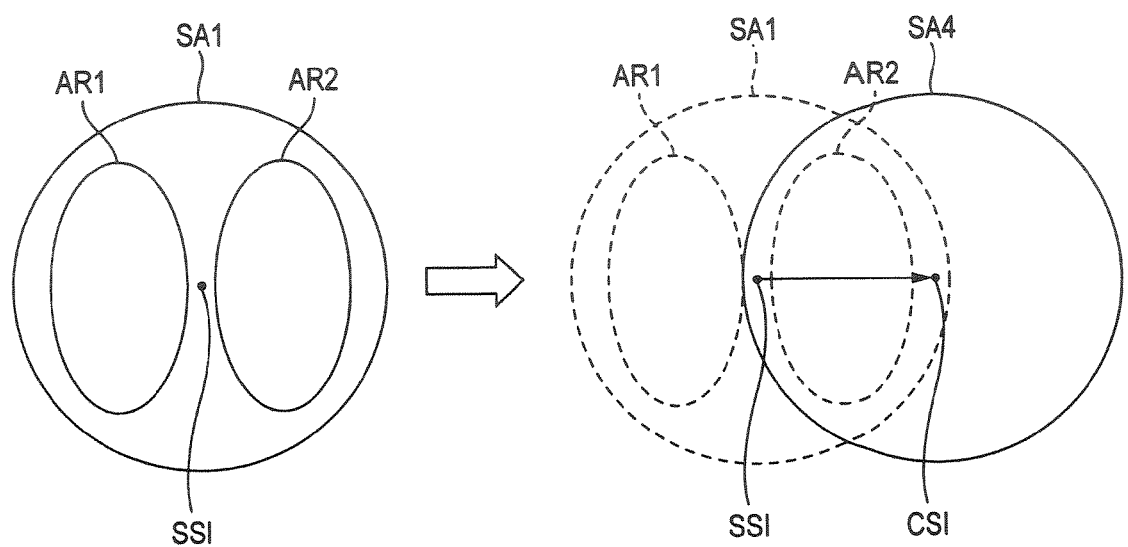
FIG. 13 is a schematic diagram for explaining update of contents of the play list according to a second processing method.

In this way, as shown in FIG. 13, when there are pieces of music often listened to by the user and pieces of music rarely listened to by the user in the piece of selected music and the plural pieces of candidate music registered in the play list 50, the central processing unit 10 detects distributions of the music indicators SI indicating the pieces of music often listened to and the music indicators SI indicating the pieces of music rarely listened to in the spherical selection area SA1, which is set in the three-dimensional space image TDI with the selection reference impression value SSI as the center when the play list 50 is created. The central processing unit 10 moves, in the three-dimensional space image TDI, the selection reference impression value SSI to be separated as far as possible from a first area AR1 in which a relatively larger number of the music indicators SI indicating the pieces of music rarely listened to are distributed and to be close to or to enter a second area AR2 in which a relatively large number of the music indicators SI indicating the pieces of music often listened to are distributed. In this way, the central processing unit 10 changes the selection reference impression value SSI to a new corrected reference impression value CSI and changes the selection area SA1 to a new spherical selection area SA4 obtained by moving a place thereof around the corrected reference impression value CSI. Consequently, the central processing unit 10 selects a piece of selected music and plural pieces of candidate music having impressions as close as possible to impressions of the user's preferences represented by the corrected reference impression value CSI in the new selection area SA4 in the three-dimensional space image TDI and re-registers the piece of selected music and the plural pieces of candidate music in the play list 50. Therefore, when pieces of music often listened to by the user and pieces of music rarely listened to by the user are mixed in the piece of selected music and the plural pieces of candidate music registered in the play list 50, the central processing unit 10 corrects contents of the play list 50 to increase pieces of music having impressions close to the impressions of the user's preferences and reduce pieces of music having impressions different from the impressions of the user's preferences (i.e., the pieces of music rarely listened to). Consequently, the central processing unit 10 can cause the user to listen to more pieces of music having impressions as close as possible to the impressions of the user's preferences (i.e., the piece of selected music and the plural pieces of candidate music).

When the third processing method is selected by the user in the processing for correcting contents of the play list 50, the central processing unit 10 compares the numbers of times of respective pieces of music (i.e., the piece of selected music and the plural pieces of candidate music) registered in the correction object play list 50 with an individual reference number of times of playback selected in advance in the same manner as the case in which the second processing method is selected. The central processing unit 10 detects three-dimensional space coordinates on which the music indicators SI indicating pieces of music played the individual reference number of times of playback or more are arranged among three-dimensional space coordinates on which the respective pieces of music registered in the correction object play list 50 are arranged. The central processing unit determines a direction of an impression value representing an impression as close as possible to an impression of the user's preference (hereinafter referred to as preference impression direction) from the selection reference impression value SSI (i.e., the selected position space coordinate of the expanded selected position P0) included in the correction object play list 50 directly using the three-dimensional space coordinates detected or using the three-dimensional space coordinates after weighting the three-dimensional space coordinates according to the numbers of times of playback (i.e., weight is set larger as the number of times of playback is larger). The central processing unit 10 calculates space distances between the selection reference impression value SSI corrected (i.e., the selected position space coordinate) and the three-dimensional space coordinates on which the music indicators SI indicating the respective pieces of music are arranged and compares the space distances. According to such comparison, the central processing unit 10 determines the music indicators SI in order from the music indicator SI in a position closest to the expanded selected position P0 indicated by the selection reference impression value SSI (i.e., the selected position space coordinate) to the music indicators SI in positions far from the expanded selected position P0. The central processing unit 10 selects, for example, the music indicators SI by an increased number of selections (e.g., twenty) again to select the music indicators SI located in the preference impression direction more than the music indicators SI located in a direction opposed to the preference impression direction (hereinafter referred to as different impression direction) by a predetermined ratio out of the plural music indicators SI determined. The central processing unit 10 determines pieces of music corresponding to the plural music indicators SI selected in this way as a piece of selected music and plural pieces of candidate music in the same manner as above. The central processing unit 10 deletes (i.e., cancels the registration of) a piece of selected music and plural pieces of candidate music already registered in the correction object play list 50, re-registers the piece of selected music and the plural pieces of candidate music determined in the correction object play list 50, and corrects the contents of the play list 50. Consequently, the central processing unit 10 sends the play list 50, the contents of which are corrected, to the hard disk 16 as play list data and overwrites the play list data before the content correction with the play list data to record the play list data.

Figure 14:
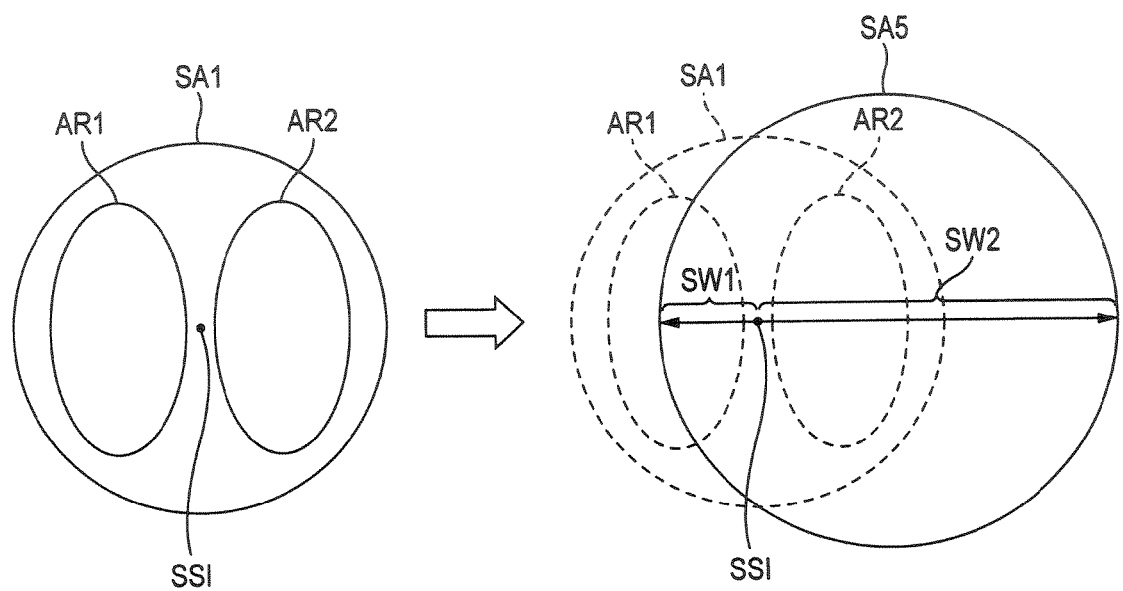
FIG. 14 is a schematic diagram for explaining update of contents of the play list according to a third processing method.

In this way, as shown in FIG. 14, when there are pieces of music often listened to by the user and pieces of music rarely listened to by the user in the piece of selected music and the plural pieces of candidate music registered in the play list 50, the central processing unit 10 detects distributions of the music indicators SI indicating the pieces of music often listened to and the music indicators SI indicating the pieces of music rarely listened to in the spherical selection area SA1, which is set in the three-dimensional space image TDI with the selection reference impression value SSI as the center when the play list 50 is created. The central processing unit 10 changes, in the three-dimensional space image TDI, the selection area SA1 to a new selection area SA5 of, for example, a spherical shape or an ellipsoidal shape to, with the selection reference impression value SSI as an origin, reduce a first selection width SW1 in the different impression direction in which the first area AR1 is present and increase a second selection width SW2 in the preference impression direction in which the second area SA2 is present. Consequently, the central processing unit 10 selects a piece of selected music and plural pieces of candidate music having impressions as close as possible to impressions of the user's preferences in the new selection area SA5 in the three-dimensional space image TDI and re-registers the piece of selected music and the plural pieces of candidate music in the play list 50. Therefore, when pieces of music often listened to by the user and pieces of music rarely listened to by the user are mixed in the piece of selected music and the plural pieces of candidate music registered in the play list 50, the central processing unit 10 corrects contents of the play list 50 to increase pieces of music having impressions close to the impressions of the user's preferences and reduce pieces of music having impressions different from the impressions of the user's preferences (i.e., the pieces of music rarely listened to). Consequently, the central processing unit 10 can cause the user to listen to more pieces of music having impressions as close as possible to the impressions of the user's preferences (i.e., the piece of selected music and the plural pieces of candidate music).

Figure 15:
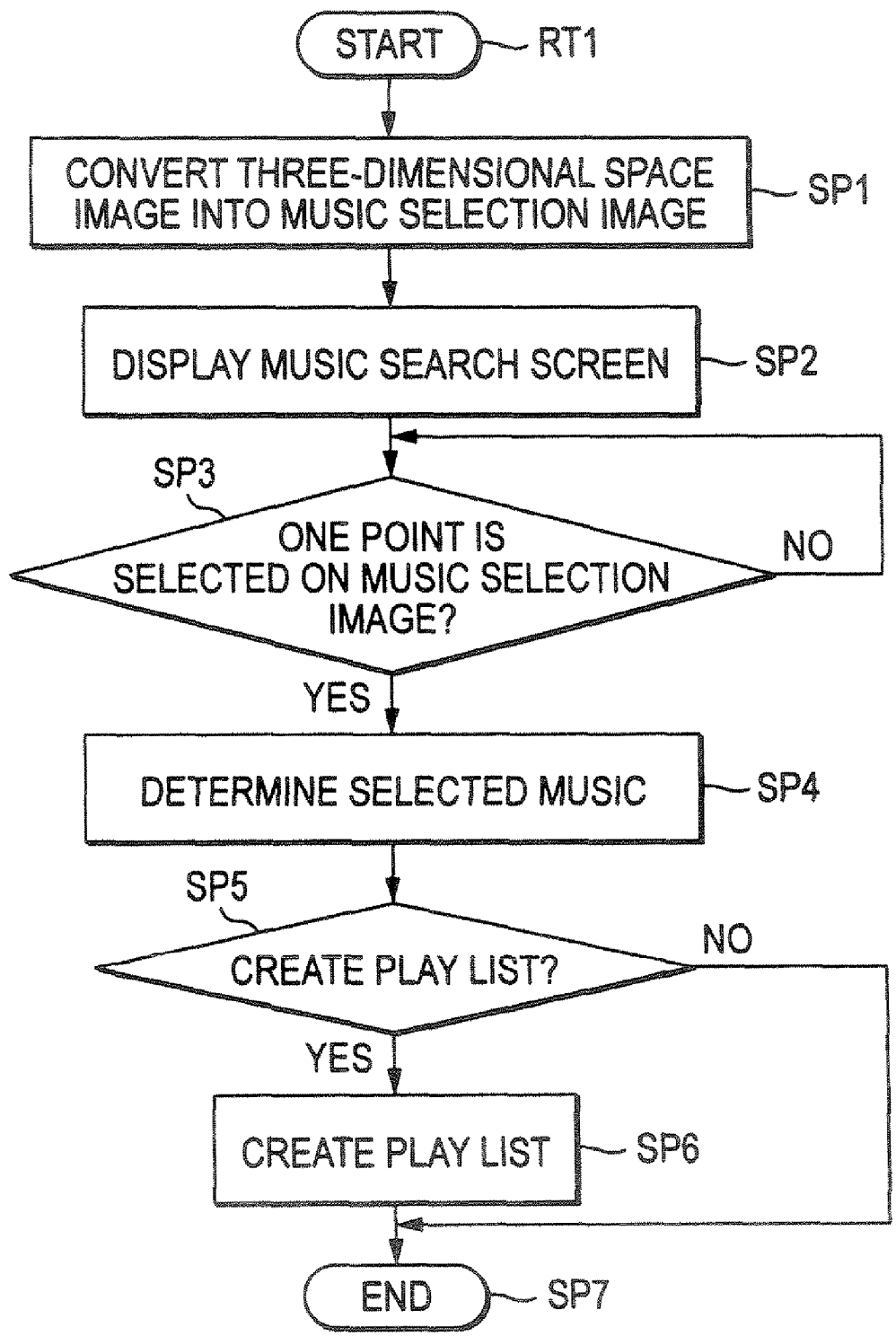
FIG. 15 is a flowchart showing a music selection processing procedure.

Actually, the central processing unit 10 executes the series of music selection processing described above in accordance with the music selection program stored in the ROM 12 in advance. When a music selection request is inputted by the user via the operation key 14, the central processing unit 10 starts a music selection processing procedure RT1 shown in FIG. 15 in accordance with the music selection program. When the music selection processing procedure RT1 is started, in step SP1, the central processing unit 10 directly sets a set of first, second, and third impression item values SP, EL, and NE included in all pieces of music analysis information 25, respectively, as three-dimensional space coordinates. The central processing unit 10 converts the three-dimensional space image TDI obtained by arranging the music indicators SI on the plural three-dimensional space coordinates, respectively, into the music selection image SDI formed by a two-dimensional plane image viewed from the initial viewpoint, and shifts to the next step SP2. In step SP2, the central processing unit 10 generates music search screen data using the music selection image SDI and sends the music search image data to the display 22 via the display controller 21 to display the music search screen 30 based on the music search screen data on the display 22 and shifts to the next step SP3.

In step SP3, the central processing unit 10 waits for a dot representing an impression of the user's preference to be selected by the user on the music selection image SDI displayed in the music selection area 31 in the music search screen 30. When a dot is arbitrarily selected as a selected portion by the user on the music selection image SDI, the central processing unit 10 shifts to the next step SP4. In step SP4, the central processing unit 10 converts the dot selected by the user as an impression of the user's preference on the music selection image SDI into the expanded selected position P0 in the three-dimensional space image TDI. The central processing unit 10 determines, on the basis of a selected position space coordinate of the expanded selected position P0 serving as the selection reference impression value SSI and the three-dimensional space coordinates on which the plural music indicators SI are arranged, a piece of selected music arbitrarily selected by the user according to an impression of the user's preference. The central processing unit 10 also determines plural pieces of candidate music extremely highly likely to be selected according to the impression of the user's preference and shifts to the next step SP5.

In step SP5, the central processing unit 10 determines whether the play list 50 is created. When an affirmative result is obtained in step SP5, this indicates that the user has requested that, in future, the user can easily listen to music even if a piece of selected music and plural pieces of candidate music are not selected anew every time the user listens to music. Therefore, the central processing unit 10 shifts to the next step SP6. In step SP6, the central processing unit 10 creates the play list 50 in which the piece of selected music and the plural pieces of candidate music determined in step SP4 are registered and shifts to the next step SP7. The central processing unit 10 ends the music selection processing procedure RT1. When a negative result is obtained in step SP5, this means that the user has not requested that, in future, the user can listen to a piece of selected music and plural pieces of candidate music any time. Therefore, the central processing unit 10 skips the processing in step SP6, shifts to step SP7, and ends the music selection processing procedure RT1.

Figure 16:
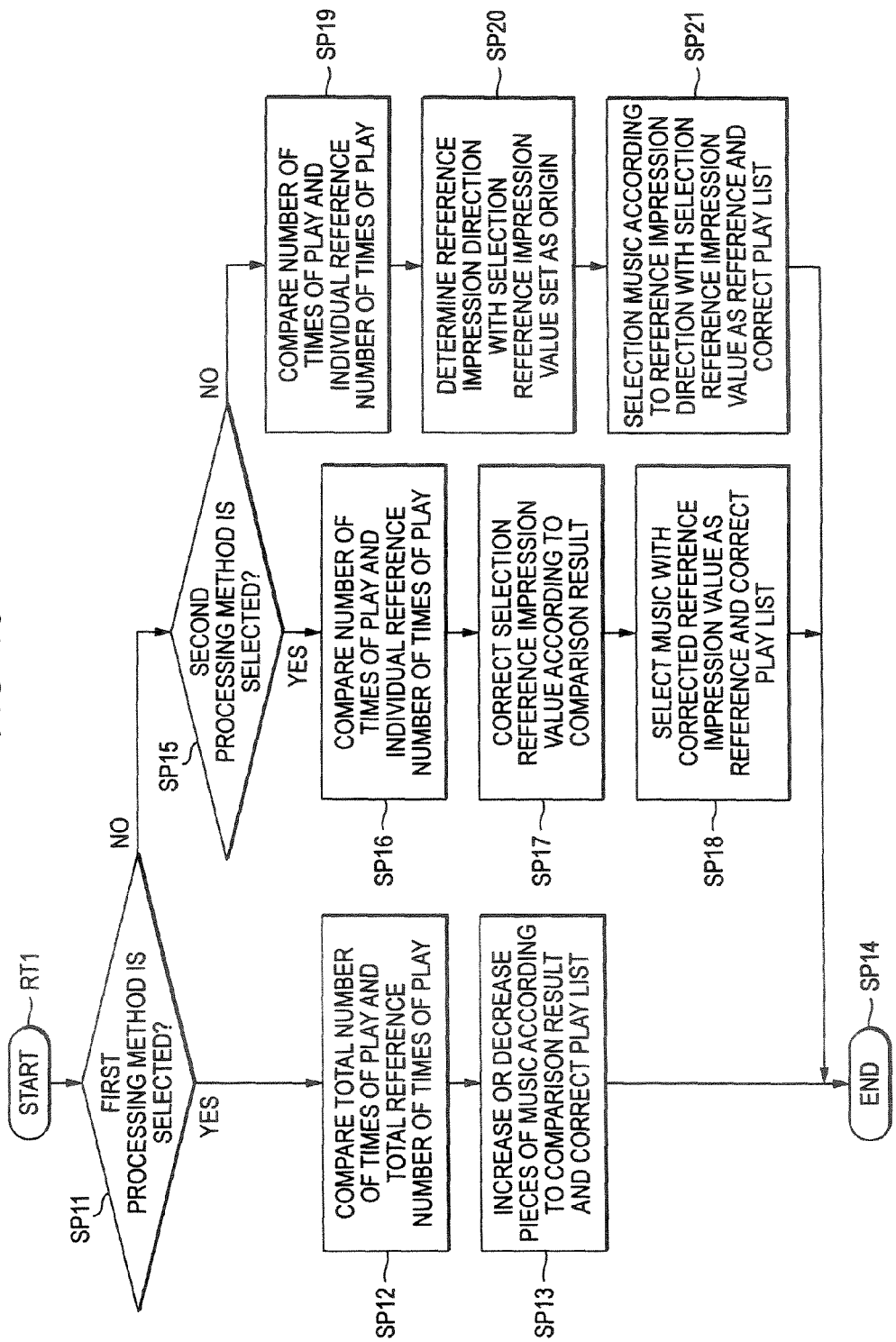
FIG. 16 is a flowchart showing a list correction processing procedure.

The central processing unit 10 executes the series of processing for correcting contents of the play list 50 in accordance with the list correction program stored in the ROM 12 in advance. When the correction object play list 50 is designated and a correction command is inputted by the user via the operation key 14, the central processing unit 10 starts a list correction processing procedure RT2 shown in FIG. 16 in accordance with the list correction program. When the list correction processing procedure RT2 is started, in step SP11, the central processing unit 10 judges whether the first processing method is selected by the user. When an affirmative result is obtained in step SP11, this indicates that the piece of selected music and the plural pieces of candidate music registered in the correction object play list 50 are music having impressions of the user's preferences as a whole or are different from the impressions of the user's preferences as a whole. Therefore, the central processing unit 10 shifts to the next step SP12.

In step SP12, the central processing unit 10 totals the number of times of playback of all the pieces of music (i.e., the piece of selected music and the plural pieces of candidate music) registered in the correction object play list 50. The central processing unit 10 compares a total number of times of playback obtained with the total reference number of times of playback, and shifts to the next step SP13. In step SP13, the central processing unit 10 changes the reference number of selections to an increased number of selections or a reduced number of selections according to a result of the comparison. The central processing unit 10 selects the music indicators SI by the increased number of selections or the reduced number of selections corresponding to the result of the comparison again. The central processing unit 10 determines pieces of music corresponding to the plural music indicators SI selected, respectively, as a piece of selected music and plural pieces of candidate music. The central processing unit 10 corrects the contents of the correction object play list 50 to additionally register the plural pieces of candidate music therein or corrects the contents of the correction object play list 50 to delete a part of the pieces of candidate music according to a result of the determination. The central processing unit 10 shifts to the next step SP14 and ends the list correction processing procedure RT2.

On the other hand, when a negative result is obtained in step SP11, this indicates that pieces of music often listened to by the user and pieces of music rarely listened to by the user are mixed in the piece of selected music and the plural pieces of candidate music registered in the correction object play list 50. Therefore, the central processing unit 10 shifts to the next step SP15. In step SP15, the central processing unit 10 judges whether the second processing method is selected by the user. When an affirmative result is obtained in step SP15, this indicates that the user has requested that at least a part of pieces of music be changed to new pieces of music without changing the total number of the piece of selected music and the plural pieces of candidate music registered in the correction object play list 50. Therefore, the central processing unit 10 shifts to the next step SP16. In step SP16, the central processing unit 10 compares the numbers of times of playback of the respective pieces of music (i.e., the piece of selected music and the plural pieces of candidate music) registered in the correction object play list 50 with the individual reference number of times of playback, respectively, and shifts to the next step SP17. In step SP17, the central processing unit 10 corrects the selection reference impression value SSI to the corrected reference impression value CSI according to a result of the comparison to change a place of a selected area for the music indicators SI. The central processing unit 10 selects the music indicators SI by the reference number of selections with the corrected reference impression value CSI set as a reference. The central processing unit 10 determines pieces of music corresponding to the plural music indicators SI selected, respectively, as a piece of selected music and plural pieces of candidate music. The central processing unit 10 corrects the contents of the correction object play list 50 to re-register the piece of selected music and the plural pieces of candidate music determined. The central processing unit 10 shifts to step SP14 and ends the list correction processing procedure RT2.

When a negative result is obtained in step SP15, this means that the user has requested that at least a part of pieces of music be changed to new pieces of music together with the total number of the piece of selected music and the plural pieces of candidate music registered in the correction object play list 50. Therefore, the central processing unit 10 shifts to the next step SP19. In step SP19, the central processing unit 10 compares the numbers of times of playback of the respective pieces of music (i.e., the piece of selected music and the plural pieces of candidate music) registered in the correction object play list 50 with the individual reference number of times of playback and shifts to the next step SP20. In step SP20, the central processing unit 10 determines a preference impression direction for selecting more music indicators SI with the selection reference impression value SSI set as a reference according to a result of the comparison. The central processing unit 10 also changes a place of a selection area for the music indicators SI and the number of selections of the music indicators SI according to the preference impression direction and shifts to the next step SP21. In step SP21, the central processing unit 10 selects the music indicators SI by the increased number of selections again according to the preference impression direction with the selection reference impression value SSI as a reference. The central processing unit 10 determines pieces of music corresponding to the plural music indicators SI selected, respectively, as a piece of selected music and plural pieces of candidate music. The central processing unit 10 corrects the contents of the correction object play list 50 to re-register the piece of selected music and the plural pieces of candidate music determined. The central processing unit 10 shifts to step SP14 and ends the list correction processing procedure RT2.

In the constitution described above, the data recording and reproducing apparatus 1 records plural music data in the hard disk 16. The data recording and reproducing apparatus 1 analyzes the plural music data to digitize three kinds of items for representing an impression of each piece of music based on the music data. The data recording and reproducing apparatus 1 generates the music analysis information 25 including the first to the third impression item values SP, EL, and NE obtained as a result of the digitization. The data recording and reproducing apparatus 1 also records the music analysis information 25 for each piece of music in the hard disk 16. When the data recording and reproducing apparatus 1 is requested by the user to select music, the data recording and reproducing apparatus 1 directly sets the set of the first to the third impression item values SP, EL, and NE included in all the pieces of music analysis information 25 as three-dimensional space coordinates formed by music impression values representing impressions of respective kinds of music. The data recording and reproducing apparatus 1 converts the three-dimensional space image TDI obtained by arranging the music indicators SI on the plural three-dimensional space coordinates, respectively, into the music selection image SDI formed by a two-dimensional plane image viewed from the initial viewpoint. The data recording and reproducing apparatus 1 displays the music search screen 30 including the music selection image SDI on the display 22.

In this state, when a dot representing an impression of the user's preference is arbitrarily selected as a selected portion by the user on the music selection image SDI displayed in the music selection area 31 in the music search screen 30, the data recording and reproducing apparatus 1 converts the dot selected into the expanded selected position P0 in the three-dimensional space image TDI. The data recording and reproducing apparatus 1 selects plural music impression values present in a predetermined selection area with the selection reference impression value SSI formed by the three-dimensional space coordinates of the expanded selected position P0 set as a reference (i.e., a selection area appropriately determined according to space distances between the expanded selected position P0 and the plural music indicators SI and the reference number of selections for selecting the music indicators SI) in the three-dimensional space image TDI. The data recording and reproducing apparatus 1 determines that predetermined one piece of music of plural pieces of music corresponding to the plural music impression values selected is a piece of selected music arbitrarily selected according to an impression of the user's preference. The data recording and reproducing apparatus 1 determines that the remaining plural pieces of music are plural pieces of candidate music extremely highly likely to be selected according to the impression of the user's preference. When the data recording and reproducing apparatus 1 is requested by the user to create the play list 50 in a state in which the piece of selected music and the plural pieces of candidate music are determined, the data recording and reproducing apparatus 1 creates the play list 50 in which the piece of selected music and the plural pieces of candidate music are registered.

In this way, after the play list 50 is created, when the play list 50 used for playback of music is selected by the user and playback of the music is requested, the data recording and reproducing apparatus 1 plays the piece of selected music and the plural pieces of candidate music registered in the play list 50 in order in accordance with the play list 50 and causes the user to listen to the music. When the piece of selected music and the plural pieces of candidate music registered in the play list 50 are played using the play list 50, the data recording and reproducing apparatus 1 counts the number of times of playback of the piece of selected music and the plural pieces of candidate music. When the data recording and reproducing apparatus 1 is requested by the user to correct contents of the play list 50, the data recording and reproducing apparatus 1 changes a selection area (e.g., a reference number of selections) used for selection of a piece of selected music and plural pieces of candidate music using the number of times of playback of the piece of selected music and the plural pieces of candidate music registered in the correction object play list 50 as an evaluation value for evaluating how close to impressions of the user's preferences the piece of selected music and the plural pieces of candidate music are. Consequently, the data recording and reproducing apparatus 1 corrects the contents of the play list 50 on the basis of the selection area changed and the plural music impression values.

Therefore, the data recording and reproducing apparatus 1 detects the evaluation value indicating how close to the impressions of the user's preferences the piece of selected music and the plural pieces of candidate music registered in the play list 50 are. The data recording and reproducing apparatus 1 changes the selection area at the time of music selection on the basis of the evaluation value selected. Consequently, the data recording and reproducing apparatus 1 can correct the play list 50 created using the music impression values to register pieces of music having the impressions of the user's preferences as many as possible therein.

According to the constitution described above, the data recording and reproducing apparatus 1 records, in the hard disk 16, the music impression values obtained by digitizing impressions of plural pieces of music, respectively, and the play list 50 for registering and playing plural pieces of music corresponding to the plural music impression values in the selection area with the reference impression value SSI set as a reference. According to playback of music, the data recording and reproducing apparatus 1 detects evaluation values of the plural pieces of music and changes the selection area on the basis of the evaluation values detected. The data recording and reproducing apparatus 1 corrects the play list 50 according to the selection area changed and the plural music impression values recorded. Consequently, the data recording and reproducing apparatus 1 can correct the play list 50 created using the music impression values to register music of the user's preferences. Thus, the data recording and reproducing apparatus 1 can play music having impressions of the user's preferences in accordance with the play list 50.

The data recording and reproducing apparatus 1 causes the user to arbitrarily select the first to the third processing methods and corrects the contents of the play list 50 according to how closer to impressions of the user's preferences the piece of selected music and the plural pieces of candidate music registered in the correction object play list 50 are. Consequently, the data recording and reproducing apparatus 1 can correct the contents of the play list 50 to leave pieces of music having impressions closer to the impressions of the user's preference in the correction object play list 50 as much as possible and delete pieces of music having impressions different from the impressions of the user's preferences. Since the data recording and reproducing apparatus 1 corrects the contents of the play list 50 in this way, it is possible to play and cause the user to listen to pieces of music having impressions as close as possible to the impressions of the user's preference in accordance with the play list 50.

Figure 17A:
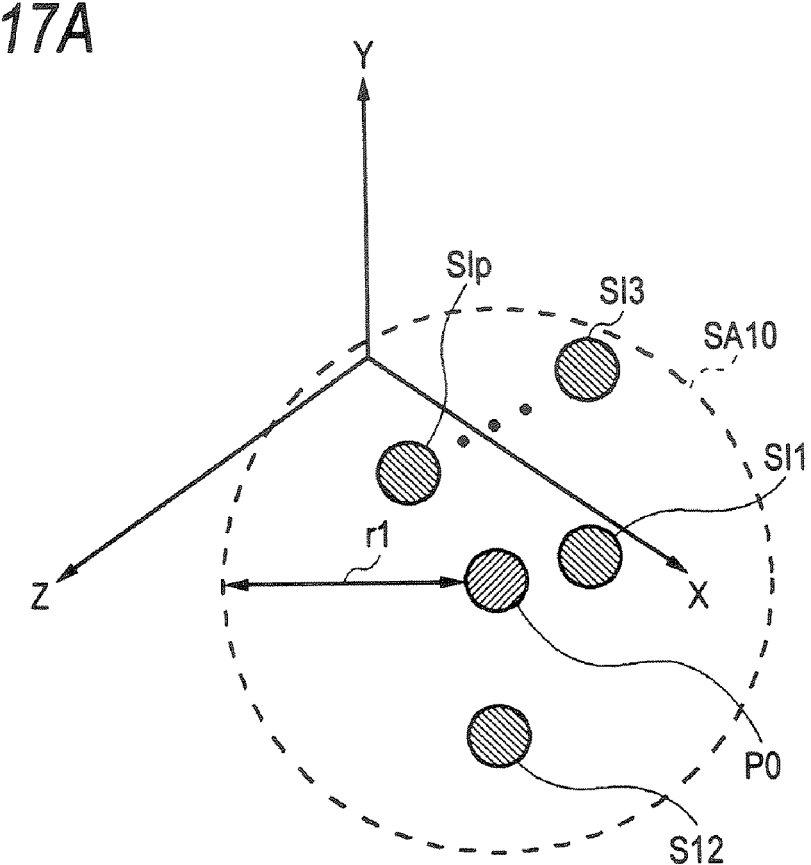
FIG. 17 is a schematic diagram for explaining selection of music according to another embodiment of the invention.
Figure 17B:
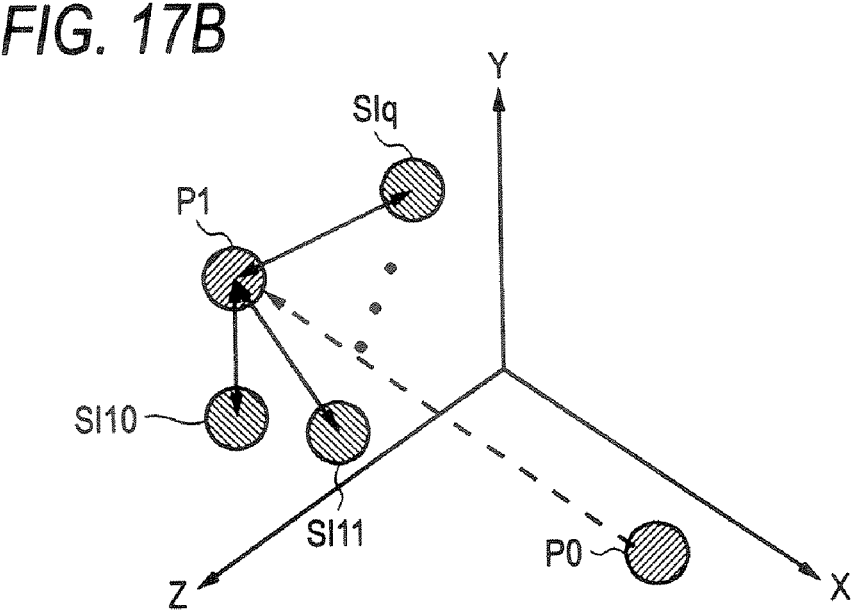

In the embodiment described above, as described with reference to FIG. 7, the data recording and reproducing apparatus 1 selects, in the three-dimensional space image TDI, music indicators SI1 to SIm by a reference selection number selected in advance in order from a music indicator in a position closest to the expanded selected position P0 to music indicators in positions far from the expanded selected position P0. The data recording and reproducing apparatus 1 determines that a piece of music corresponding to one music indicator SI1 in the position closest to the expanded selected position P0 among pieces of music corresponding to the reference selection number of music indicators SI1 to SIm selected, respectively, is a piece of selected music. The data recording and reproducing apparatus 1 determines that plural pieces of music corresponding to the remaining plural music indicators SI2 to SIm are pieces of candidate music. However, the invention is not limited to this. As shown in FIG. 17A, the data recording and reproducing apparatus 1 may select, in the three-dimensional space image TDI, all the music indicators SI1 to SIm present in a selection area SA10 formed by a sphere having a predetermined radius r1 with the expanded selected position P0 set as the center, determine that, for example, a piece of music corresponding to one music indicator SI1 in a position closest to the expanded selected position P0 among pieces of music corresponding to the music indicators SI1 to SIm selected, respectively, is a piece of selected music, and determine that plural pieces of music corresponding to the remaining plural music indicators SI2 to SIp are pieces of candidate music. As shown in FIG. 17B, the data recording and reproducing apparatus 1 may also select, in the three-dimensional space image TDI, music indicators SI10 to SIq by a reference selection number in order from a music indicator in a position closes to the selected position P1 most distant from a viewpoint on a line of sight passing the expanded selected position P0 (or in the inner part by a predetermined distance selected in advance from the expanded selected position P0) to music indicators far from the selected position P1 (select all the music indicators SI present in a selection area of a spherical shape having a predetermined radius with the selected position P1 set as the center), determine that a piece of music corresponding to one music indicator SI10 in a position closest to the selected position P1 among pieces of music corresponding to the music indicators SI10 to SIq selected, respectively, is a piece of selected music, and determine that plural pieces of music corresponding to the remaining plural music indicators SI11 to SIq are pieces of candidate music.

Figure 18A:
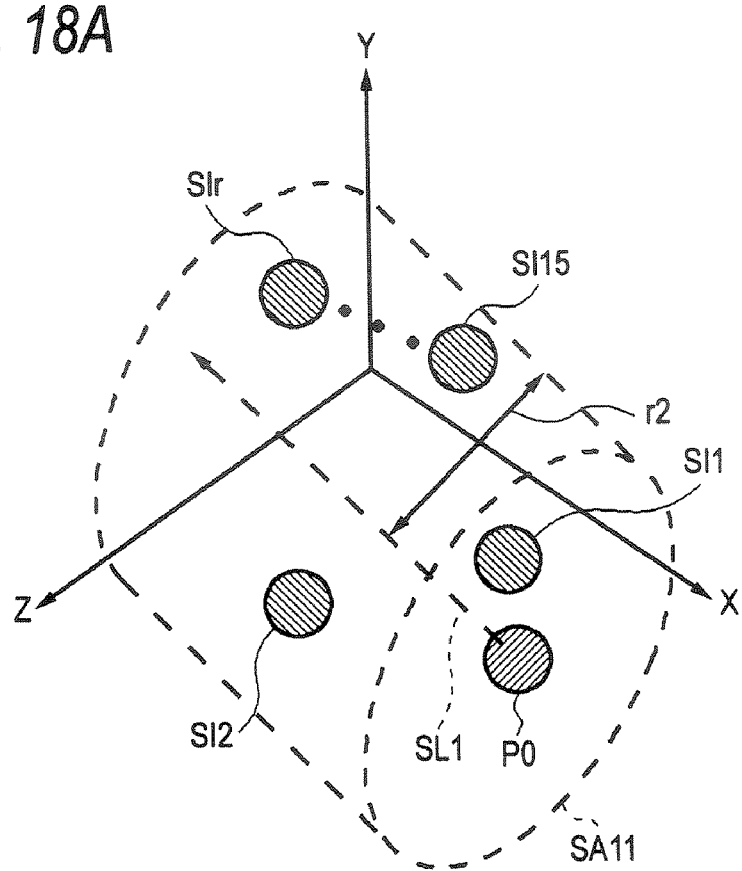
FIG. 18 is a schematic diagram for explaining selection of music according to still another embodiment of the invention.
Figure 18B:
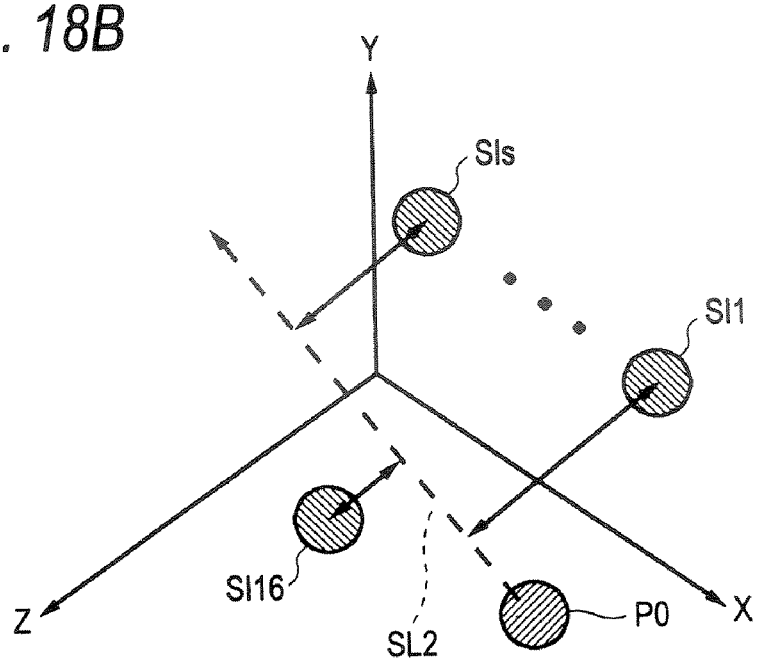
Figure 19:
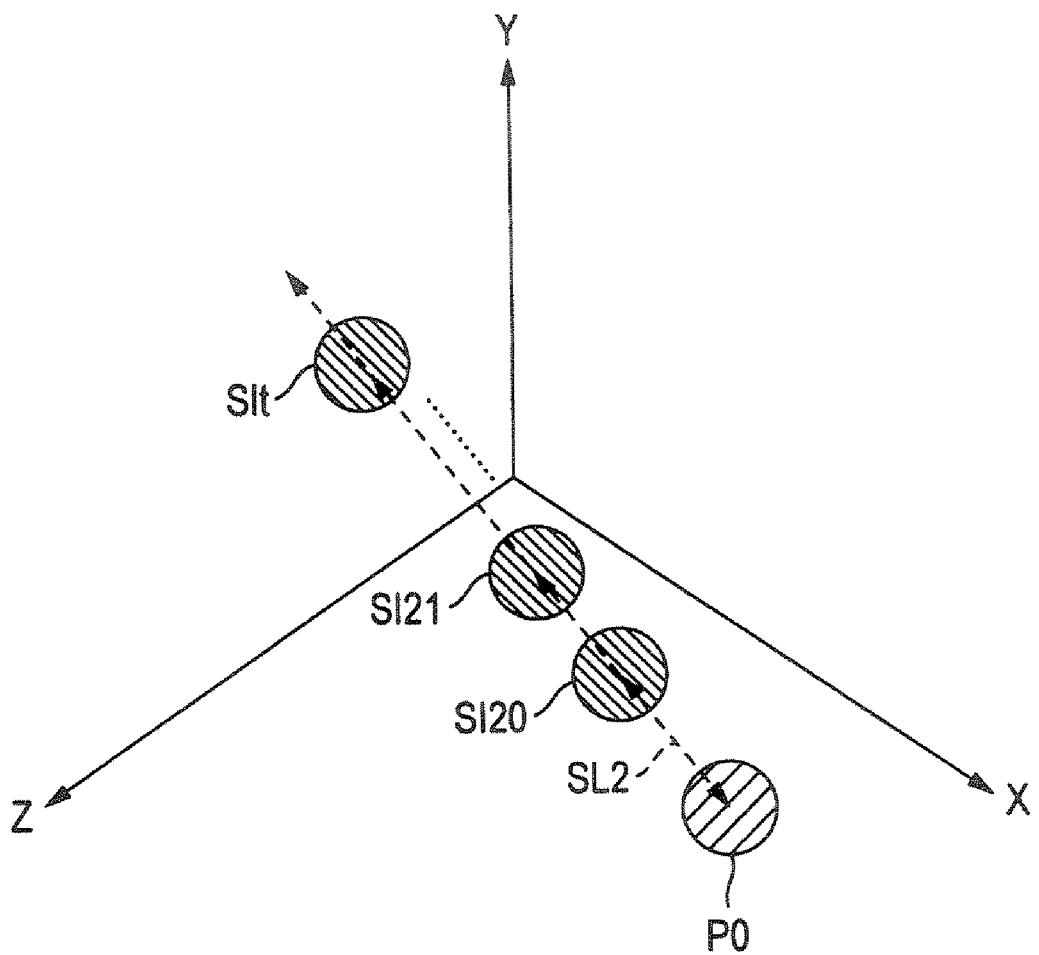
FIG. 19 is a schematic diagram for explaining selection of music according to still another embodiment of the invention.

In addition, as shown in FIGS. 18A and 18B, the data recording and reproducing apparatus 1 may select, in the three-dimensional space image TDI, all music indicators SI1 to SIr present in a selection area SA11 formed by a cylinder having a predetermined radius r2 with a line of sight passing the expanded selected position P0 set as a center axis SL1, determine that, for example, a piece of music corresponding to one music indicator SI2 in a position closest to the center axis SL1 among pieces of music corresponding to the music indicators SI1 to SIr selected, respectively, is a piece of selected music, and determine that plural pieces of music corresponding to the remaining plural music indicators SI1 to SIr are pieces of candidate music. The data recording and reproducing apparatus 1 may also select, in the three-dimensional space image TDI, with a line of sight passing the expanded selected position P0 as a selection reference line SL2, music indicators SI1 to SIs by a reference selection number in order from a music indicator closest to the selection reference line SL2 to music indicators in positions far from the selection reference line SL2, determine that, for example, a piece of music corresponding to one music indicator SI16 in a position closest to the selection reference line SL2 among pieces of music corresponding to the music indicators SI1 to SIs selected, respectively, is a piece of selected music, and determine that plural pieces of music corresponding to the remaining plural music indicators SI2 to SIs are pieces of candidate music. Moreover, as shown in FIG. 19, the data recording and reproducing apparatus 1 may also select, in the three-dimensional space image TDI, with a line of sight passing the expanded selected position P0 as the selection reference line SL2, music indicators SI20 to SIt located on the selection reference line SL2, determine that, for example, a piece of music corresponding to one music indicator SI20 in a position closest to the expanded selected position P0 among pieces of music corresponding to the music indicators SI20 to SIt selected, respectively, is a piece of selected music, and determine that plural pieces of music corresponding to the remaining plural music indicators SI21 to SIt are pieces of candidate music.

In the embodiment described above, the data recording and reproducing apparatus 1 selects, in the three-dimensional space image TDI, plural pieces of candidate music with the expanded selected position P0 or the selected position P1 as a reference. However, the data recording and reproducing apparatus 1 may select one piece of selected music with the expanded selected position P0 or the selected position P1 as a reference and, then, select plural pieces of candidate music with the music indicator S1 indicating the selected music as a reference (i.e., in a selection area close in distance to the music indicator SI or with the music indicator SI set as the center). Even in such a case, the data recording and reproducing apparatus 1 can make at least two kinds of items among the three kinds of items representing impressions of pieces of music substantially consistent with the user's preferences and select pieces of music having impressions as close as possible to impressions of the user's preferences.

In the embodiment described above, the data recording and reproducing apparatus 1 selects, in the three-dimensional space image TDI, the music indicators SI present in the selection areas SA1 to SA5 of a circular shape with the expanded selected position P0 set as the center and determines pieces of music corresponding to the music indicators SI selected as a piece of selected music and plural pieces of candidate music. However, the invention is not limited to this. For example, the data recording and reproducing apparatus 1 may select, in the three-dimensional space image TDI, the music indicators SI present in a selection area of various shapes such as a circular shape parallel to an XY plane, a YZ plane, and a ZX plane with the expanded selected position P0 set as the center and determine pieces of music corresponding to the music indicators SI selected as a piece of selected music and plural pieces of candidate music. Moreover, the data recording and reproducing apparatus 1 may determine a piece of selected music and plural pieces of candidate music with a position of a selected potion as a reference on the music selection image SDI formed by a two-dimensional plane image.

In the embodiment described above, as described with reference to FIG. 7, the data recording and reproducing apparatus 1 selects, in the three-dimensional space image TDI, music indicators SI1 to SIm by a reference selection number selected in advance in order from a music indicator in a position closest to the expanded selected position P0 to music indicators in positions far from the expanded selected position P0. The data recording and reproducing apparatus 1 determines that a piece of music corresponding to one music indicator SI1 in the position closest to the expanded selected position P0 among pieces of music corresponding to the reference selection number of music indicators SI1 to SIm selected, respectively, is a piece of selected music. The data recording and reproducing apparatus 1 determines that plural pieces of music corresponding to the remaining plural music indicators SI2 to SIm are pieces of candidate music. However, the invention is not limited to this. The data recording and reproducing apparatus 1 may select, in the three-dimensional space image TDI, the plural music indicators SI with the expanded selected position P0 as a reference and determine that all pieces of music corresponding to the plural music indicators SI selected, respectively, are pieces of selected music.

In the embodiment described above, the data recording and reproducing apparatus 1 causes the user to arbitrarily select one dot as a selected portion on the music selection image SDI. However, the invention is not limited to this. The data recording and reproducing apparatus 1 may cause the user to arbitrarily select an area of a predetermined shape such as a circular shape as a selected portion on the music selection image SDI. For example, when various frames such as frames of circular, elliptical, and square shapes are arbitrarily drawn by the user according to a moving locus of the cursor Cu on the music selection image SDI, the data recording and reproducing apparatus 1 may select the music indicators DI present in such frames and determine all pieces of music corresponding to the music indicators SI selected are pieces of selected music. When the plural pieces of selected music are determined according to the frames drawn by the user in this way, the data recording and reproducing apparatus 1 may create a play list in which all the plural pieces of selected music are registered. Consequently, the data recording and reproducing apparatus 1 can cause the user to freely select pieces of music having impressions, which the user wishes to register in the play list, according to impressions of the user's preferences.

In the embodiment described above, the data recording and reproducing apparatus 1 analyzes plural music data recorded in the hard disk 16 to digitize three kinds of items such as speed, a tone, and an age for representing an impression of each piece of music based on the music data, respectively, and obtain music impression values serving as the first, second, and third impression item values SP, EL, and NE. However, the invention is not limited to this. If at least one kind of item is digitized, the data recording and reproducing apparatus 1 may digitize other various kinds of items like a tone such as tempo and cheerfulness and an atmosphere such as refreshment for representing an impression of each piece of music to obtain music impression values.

In the embodiment described above, the data recording and reproducing apparatus 1 creates the play list 50, which is used for playback of music in the data recording and reproducing apparatus 1. However, the invention is not limited to this. The data recording and reproducing apparatus 1 may transmit the play list 50 and music data of a piece of selected music and plural pieces of candidate music registered in the play list 50 to an external apparatus via the external apparatus interface 20 for communication with the external apparatus and cause the external apparatus to record the play list 50 and the music data. The external apparatus may play the registered piece of selected music and plural pieces of candidate music in order in accordance with the play list 50. In the case in which the external apparatus plays the piece of selected music and the plural pieces of candidate music in order in accordance with the play list 50, when the external apparatus is connected to the external apparatus interface 20, the data recording and reproducing apparatus may receive and capture an evaluation value, which is detected by the external apparatus by evaluating the number of times of playback of the piece of selected music and the plural piece of candidate music registered in the play list 50 and sent to the data recording and reproducing apparatus 1, through the external apparatus interface 20, change the selection area on the basis of such an evaluation value, and correct the contents of the play list 50. When the contents of the play list 50 used for playback of music in the external apparatus are corrected in this way, the data recording and reproducing apparatus 1 may transmit the play list 50, the contents of which are corrected, to the external apparatus via the external apparatus interface 20 and cause the external apparatus to update the play list 50. When the data recording and reproducing apparatus 1 transmits the play list 50, the contents of which are corrected, to the external apparatus via the external apparatus interface 20 in this way, the data recording and reproducing apparatus 1 may also transmit music data of pieces of music registered in the play list 50 anew in the correction of the contents of the play list 50 to the external apparatus via the external apparatus interface 20.

In the embodiment described above, the data recording and reproducing apparatus 1 creates the play list 50, which is used for playback of music in the data recording and reproducing apparatus 1. However, the invention is not limited to this. The data recording and reproducing apparatus 1 may use the play list 50 for transfer of music data of the piece of selected music and the plural pieces of candidate music registered therein to the external apparatus. When the play list 50 is used for transfer of the music data in this way, the data recording and reproducing apparatus 1 may cause the user to select whether the piece of selected music and the plural pieces of candidate music registered in the play list 50 are transferred, respectively, and may adjust a selection area with the numbers of times of transfer of the piece of selected music and the plural pieces of candidate music as evaluation values, respectively.

In the embodiment described above, the data recording and reproducing apparatus 1 counts the numbers of times of playback of the piece of selected music and the pieces of candidate music registered in the play list 50, respectively, and sets the numbers of times of playback as evaluation values used for the change of a selection area. However, the invention is not limited to this. The data recording and reproducing apparatus 1 may digitize closeness of the piece of selected music and the plural pieces of candidate music registered in the play list 50 to impressions of the user's preferences, cause the user to evaluate the closeness with the impressions of the user's preferences as a reference, and adjust the selection area using evaluation values obtained from results of the evaluation. In this case, when the data recording and reproducing apparatus 1 corrects the contents of the play list 50 by changing the selection area according to the evaluation values, the data recording and reproducing apparatus 1 may cause the user to arbitrarily select a piece of music that is deleted by no means and a piece of music that is typically deleted regardless of the changed contents of the selection area among the piece of selected music and the plural pieces of candidate music registered in the play list 50 and reflect the selected contents on the correction of the contents of the play list 50.

In the embodiment described above, the data recording and reproducing apparatus 1 corrects the contents of the play list 50 on the basis of the evaluation values of the piece of selected music and the pieces of candidate music registered in the correction object play list 50 using the selection area changed. However, the data recording and reproducing apparatus 1 may create plural new play lists using music impression values of the piece of selected music and the plural pieces of candidate music registered in the correction object play list 50 as reference impression values, respectively. In the case of such a constitution, the data recording and reproducing apparatus 1 determines, on the basis of the evaluation values of the piece of selected music and the plural pieces of candidate music registered in the play list 50, an individual selection area with music impression values of the piece of selected music and the plural pieces of candidate music corresponding thereto set as reference impression values. The data recording and reproducing apparatus 1 creates a new play list in which pieces of music corresponding to the plural music impression values in the individual selection area corresponding to the reference impression values formed by the plural music impression values with the reference impression values set as references, respectively, are registered.

In the embodiment described above, the list correction processing procedure RT2 described above with reference to FIG. 16 is executed in accordance with the list correction program stored in the ROM 12 in advance. However, the invention is not limited to this. The list correction processing procedure RT2 may be executed by installing program storage media having other list correction programs of various constitutions stored therein in the data recording and reproducing apparatus 1.

In the embodiment described above, the content reproducing apparatus and the list correcting apparatus according to the embodiment of the invention are applied to the data recording and reproducing apparatus 1 described above with reference to FIGS. 1 to 19. However, the invention is not limited to this. It is possible to widely apply the invention to other content reproducing apparatuses and list correcting apparatuses of various constitutions like information processing apparatuses such as a computer, a cellular phone, a PDA (Personal Digital Assistant), and a game machine and recording and reproducing apparatuses such as a video camera, a digital still camera, a DVD (Digital Versatile Disc) recorder, and a hard disk recorder.

In the embodiment described above, the music described with reference to FIGS. 1 to 19 is applied as contents. However, the invention is not limited to this. It is possible to widely apply various other contents like a photograph image, a moving image such as a movie, and a game program as the contents.

In the embodiment described above, the hard disk 16 described with reference to FIGS. 1 to 19 is applied as a recording unit that records content impression values obtained by digitizing impressions of plural contents, respectively, and a list for registering plural contents corresponding to plural content impression values in a selection area with a reference impression value set as a reference and causing the user to use the plural contents. However, the invention is not limited to this. It is possible to widely apply various other recording units like media that record content impression values and lists such as a disc-like recording medium and a semiconductor recording medium detachably attachable to the data recording and reproducing apparatus 1 as the recording unit.

In the embodiment described above, the play list 50 described above with reference to FIGS. 1 to 19 is applied as a list for registering plural contents corresponding to plural content impression values in a selection area with a reference impression value set as a reference, which are recorded in the recording unit, and causing the user to use the plural contents. However, the invention is not limited to this. It is possible to widely apply various other lists like a transfer list for data transfer as the list.

In the embodiment described above, the central processing unit 10 described above with reference to FIGS. 1 to 19 is applied as an evaluation-value detecting unit that detects evaluation values of plural contents registered in the list according to playback of contents by a reproducing unit. However, the invention is not limited to this. It is possible to widely apply various other evaluation-value detecting units like an evaluation-value detecting circuit of a hardware configuration that detects evaluation values of plural contents registered in the list according to playback of contents by the reproducing unit as the evaluation-value detecting unit.

In the embodiment described above, the central processing unit 10 described above with reference to FIGS. 1 to 19 is applied as a selection-area changing unit that changes a selection area on the basis of evaluation values detected by the evaluation value detecting unit. However, the invention is not limited to this. It is possible to widely apply various other selection-area changing unit like a selection-area changing circuit of a hardware configuration that changes a selection area on the basis of evaluation values detected by the evaluation-value detecting unit as the selection-area changing unit.

In the embodiment described above, the central processing unit 10 described above with reference to FIGS. 1 to 19 is applied as a list correcting unit that corrects the list according to a selection area set by the selection-area changing unit and plural content impression values. However, the invention is not limited to this. It is possible to widely apply various other list correcting units like a list correcting circuit of a hardware configuration that corrects the list according to a selection area changed by the selection-area changing unit and plural content impression values as the list correcting unit.

It is possible to apply the invention to data recording and reproducing apparatuses, content reproducing apparatuses such as a music delivery server and a personal computer, and list correcting apparatuses.

It should be understood by those skilled in the art that various modifications, combinations, sub-combinations, and alterations may occur depending on design requirements and other factors insofar as they are within the scope of the appended claims or the equivalents thereof.

What is claimed is:

1. A content reproducing apparatus, comprising:
a recording unit that
analyzes frequency components of each of plural content data items to determine plural content impression values representing characteristics of the content data item,
records the plural content impression values for each of the plural content data items, the content impression values obtained by digitizing the plural content data items based on the frequency analysis of the plural content data items,
registers an indicator for each of the plural content data items at a respective position in a three-dimensional spatial area having three orthogonal axes based on an assignment of each of the plural content impression values of a content data item to an axis of the three-dimensional spatial area,
converts the three-dimensional spatial area into a two-dimensional plane by projecting the three-dimensional spatial area onto the two-dimensional plane,
displays, in a selection area, the indicator for each of the plural content data items at a position in the two-dimensional plane along orthogonal axes obtained by projecting the three orthogonal axes of the three-dimensional spatial area, and
registers a list of the plural content data items in the selection area of the two-dimensional plane, the selection area set based on a reference impression value set as a reference;
a reproducing unit that reproduces the plural content data items;
an evaluation-value detecting unit that detects evaluation values of the plural content data items registered in the list according to reproduction of the plural content data items by the reproducing unit;
a selection-area changing unit that changes the selection area based on the evaluation values detected by the evaluation-value detecting unit; and
a list correcting unit that corrects the list according to the selection area changed by the selection-area changing unit.

2. The content reproducing apparatus according to claim 1, wherein
the recording unit records the plural content data items,
the reproducing unit reads out the plural content data items registered in the list from the recording unit and reproduces the plural content data items registered in the list in accordance with the list,
the evaluation-value detecting unit detects, as the evaluation values of the plural content data items registered in the list, a total number of times of reproduction of all the plural content data items according to reproduction by the reproducing unit, and
the selection-area changing unit changes, when the total number of times of reproduction serving as the evaluation values detected by the evaluation-value detecting unit is equal to or larger than a predetermined total reference number of times of reproduction, the selection area to be widened.

3. The content reproducing apparatus according to claim 1, wherein
the recording unit records the plural content data items,
the reproducing unit reads out the plural content data items registered in the list from the recording unit and reproduces the plural content data items registered in the list in accordance with the list,
the evaluation-value detecting unit detects, as the evaluation values of the plural content data items registered in the list, a total number of times of reproduction of all the plural content data items according to reproduction by the reproducing unit, and
the selection-area changing unit changes, when the total number of times of reproduction serving as the evaluation values detected by the evaluation-value detecting unit is smaller than a predetermined total reference number of times of reproduction, the selection area to be narrowed.

4. The content reproducing apparatus according to claim 1, wherein
the recording unit records the plural content data items,
the reproducing unit reads out the plural content data items registered in the list from the recording unit and reproduces the plural content data items registered in the list in accordance with the list,
the evaluation-value detecting unit detects, as the evaluation values of the plural content data items registered in the list, a number of times of reproduction of each of the plural content data items registered in the list according to reproduction by the reproducing unit, and
the selection-area changing unit corrects the reference impression value based on a number of times of reproduction serving as the evaluation values detected by the evaluation-value detecting unit.

5. The content reproducing apparatus according to claim 4, wherein the selection-area changing unit changes the selection area with the corrected reference impression value set as the reference.

6. The content reproducing apparatus according to claim 1, wherein
the recording unit records the plural content data items,
the reproducing unit reads out the plural content data items from the recording unit and reproduces the plural content data items registered in the list in accordance with the list,
the evaluation-value detecting unit detects, as the evaluation values of the plural content data items registered in the list, a number of times of reproduction of each of the plural content data items registered in the list according to reproduction by the reproducing unit,
the selection-area changing unit determines, based on the number of times of reproduction serving as the evaluation values detected by the evaluation-value detecting unit, individual selection areas each having one of the plural content data items registered in the list set as a reference, and
the list correcting unit registers a new list for each of the individual selection areas based on the reference set for each individual selection area.

7. The content reproducing apparatus according to claim 1, wherein the plural content impression values are obtained by digitizing items for representing impressions of the plural content data items.

8. The content reproducing apparatus according to claim 7, wherein the plural content impression values are obtained by digitizing each of plural kinds of items for representing impressions of the plural content data items.

9. A list correcting apparatus comprising:
   a recording unit that
      analyzes frequency components of each of plural content data items to determine plural content impression values representing characteristics of the content data item,
      records the plural content impression values for each of the plural content data items, the content impression values obtained by digitizing the plural content data items based on the frequency analysis of the plural content data items,
      registers an indicator for each of the plural content data items at a respective position in a three-dimensional spatial area having orthogonal axes based on an assignment of each of the plural content impression values of a content data item to an axis of the three-dimensional spatial area,
      converts the three-dimensional spatial area into a two-dimensional plane by projecting the three-dimensional spatial area onto the two-dimensional plane,
      displays, in a selection area, the indicator for each of the plural content data items at a position in the two-dimensional plane along orthogonal axes obtained by projecting the three orthogonal axes of the three-dimensional spatial area, and
      registers a list of the plural content data items in the selection area of the two-dimensional plane, the selection area set based on a reference impression value set as a reference;
   a communicating unit that communicates with a content reproducing apparatus which reproduces the plural content data items, and receives evaluation values of the plural content data items registered in the list from the content reproducing apparatus, the content reproducing apparatus transmitting the evaluation values to the communication unit;
   a selection-area changing unit that changes the selection area based on the evaluation values received by the communicating unit; and
   a list correcting unit that corrects the list according to the selection area changed by the selection-area changing unit.

10. The list correcting apparatus according to claim 9, wherein the communicating unit transmits the list corrected by the list correcting unit to the content reproducing apparatus.

11. The list correcting apparatus according to claim 10, wherein
   the recording unit records the plural content data items, and
   the communicating unit reads out the plural content data items registered in the list corrected by the list correcting unit from the recording unit and transmits the plural content data items registered in the list corrected by the list correcting unit to the content reproducing apparatus.

12. The list correcting apparatus according to claim 9, wherein
   the communicating unit receives a total number of times of reproduction of all the plural content data items from the content reproducing apparatus, the content reproducing apparatus reproducing the plural content data items registered in the list and transmitting the total number of times of reproduction to the list correcting apparatus as the evaluation values of the plural content data items registered in the list, and
   the selection-area changing unit changes, when the total number of times of reproduction serving as the evaluation values received by the communicating unit is equal to or larger than a predetermined total reference number of times of reproduction, the selection area to be widened.

13. The list correcting apparatus according to claim 9, wherein
   the communicating unit receives a total number of times of reproduction of all the plural content data items from the content reproducing apparatus, the content reproducing apparatus reproducing the plural content data items registered in the list and transmitting the total number of times of reproduction to the list correcting apparatus as the evaluation values of the plural content data items registered in the list, and
   the selection-area changing unit changes, when the total number of times of reproduction serving as the evaluation values received by the communicating unit is smaller than a predetermined total reference number of times of reproduction, the selection area to be narrowed.

14. The list correcting apparatus according to claim 9, wherein
   the communicating unit receives a number of times of reproduction of each of the plural content data items from the content reproducing apparatus, the content reproducing apparatus reproducing the plural content data items registered in the list and transmitting the number of times of reproduction to the list correcting apparatus as the evaluation values of the plural content data items registered in the list, and
   the selection-area changing unit corrects the reference impression value on the basis of the number of times of reproduction of each of the plural content data items serving as the evaluation values received by the communication unit.

15. The list correcting apparatus according to claim 14, wherein the selection-area changing unit changes the selection area with the corrected reference impression value set as the reference.

16. The list correcting apparatus according to claim 9, wherein
   the communicating unit receives a number of times of reproduction of each of the plural content data items from the content reproducing apparatus, the content reproducing apparatus reproducing the plural content data items registered in the list and transmitting the number of times of reproduction of each of the plural content data items registered in the list to the list correcting apparatus as the evaluation values of the plural content data items registered in the list,
   the selection-area changing unit determines, based on the number of times of reproduction serving as the evaluation values received by the communicating unit, individual selection areas each having one of the plural content data items registered in the list set as a reference, and
   the list correcting unit registers a new list for each of the individual selection areas based on the reference set for each individual selection area.

17. The list correcting apparatus according to claim 9, wherein the content impression values are obtained by digitizing items for representing impressions of the plural content data items.

18. The list correcting apparatus according to claim 17, wherein the content impression values are obtained by digitizing each of the plural kinds of items for representing impressions of the plural content data items.

19. A content reproducing method, comprising:
analyzing frequency components of each of plural content data items to determine plural content impression values representing characteristics of the content data item,
recording, by a recording processing unit, the plural content impression values for each of the plural content data items, the content impression values obtained by digitizing the plural content data items based on the frequency analysis of the plural content data items,
registering an indicator for each of the plural content data items at a respective position in a three-dimensional spatial area having orthogonal axes based on an assignment of each of the plural content impression values of a content data item to an axis of the three-dimensional spatial area,
converting the three-dimensional spatial area into a two-dimensional plane by projecting the three-dimensional spatial area onto the two-dimensional plane,
displaying, in a selection area, the indicator for each of the plural content data items at a position in the two-dimensional plane along orthogonal axes obtained by projecting the three orthogonal axes of the three-dimensional spatial area, and
registering a list of the plural content data items in the selection area of the two-dimensional plane, the selection area set based on a reference impression value set as a reference;
reproducing the plural content data items;
detecting evaluation values of the plural content data items registered in the list according to reproduction of the plural content data items;
changing the selection area based on the evaluation values detected; and
correcting the list according to the changed selection area.

20. A list correcting method, comprising:
analyzing frequency components of each of plural content data items to determine plural content impression values representing characteristics of the content data item,
recording, by a recording processing unit, the plural content impression values for each of the plural content data items, the content impression values obtained by digitizing the plural content data items based on the frequency analysis of the plural content data items,
registering an indicator for each of the plural content data items at a respective position in a three-dimensional spatial area having orthogonal axes based on an assignment of each of the plural content impression values of a content data item to an axis of the three-dimensional spatial area,
converting the three-dimensional spatial area into a two-dimensional plane by projecting the three-dimensional spatial area onto the two-dimensional plane,
displaying, in a selection area, the indicator for each of the plural content data items at a position in the two-dimensional plane along orthogonal axes obtained by projecting the three orthogonal axes of the three-dimensional spatial area, and
registering a list of the plural content data items in the selection area of the two-dimensional plane, the selection area set based on a reference impression value set as a reference;
receiving evaluation values of the plural content data items registered in the list from a content reproducing apparatus which reproduces the plural content data items, the content reproducing apparatus transmitting the evaluation values;
changing the selection area based on the evaluation values received; and
correcting the list according to the changed selection area.

21. The content reproducing apparatus according to claim 1, wherein each of the plural content data items are songs and the plural content impression values indicate a speed, a tone, and an age of the song.

* * * * *